United States Patent
Maruyama

(10) Patent No.: US 11,693,054 B2
(45) Date of Patent: Jul. 4, 2023

(54) COMPUTER-READABLE RECORDING MEDIUM STORING ANALYSIS PROGRAM, ANALYSIS METHOD, AND ANALYSIS DEVICE

(71) Applicant: FUJITSU LIMITED, Kawasaki (JP)

(72) Inventor: Daisuke Maruyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/676,886

(22) Filed: Feb. 22, 2022

(65) Prior Publication Data

US 2022/0390516 A1 Dec. 8, 2022

(30) Foreign Application Priority Data

Jun. 8, 2021 (JP) ................................. 2021-095903

(51) Int. Cl.
*G01R 31/3185* (2006.01)
*G01R 31/3181* (2006.01)
*G01R 31/317* (2006.01)

(52) U.S. Cl.
CPC ........... *G01R 31/318536* (2013.01); *G01R 31/31713* (2013.01); *G01R 31/31813* (2013.01); *G01R 31/31858* (2013.01); *G01R 31/318525* (2013.01); *G01R 31/318544* (2013.01)

(58) Field of Classification Search
CPC ...... G01R 31/318536; G01R 31/31713; G01R 31/31813; G01R 31/318525; G01R 31/318544; G01R 31/31858
USPC .......................... 714/726, 727, 728, 729, 735
See application file for complete search history.

(56) References Cited

U.S. PATENT DOCUMENTS

| | | | | |
|---|---|---|---|---|
| 5,410,552 A * | 4/1995 | Hosokawa | ..... | G01R 31/318392 714/724 |
| 5,602,856 A * | 2/1997 | Teramoto | ....... | G01R 31/318342 714/30 |
| 5,657,240 A * | 8/1997 | Chakradhar | ... | G01R 31/318371 716/132 |
| 8,006,156 B2 * | 8/2011 | Kojima | .............. | G01R 31/3016 716/108 |
| 10,234,502 B1 * | 3/2019 | Tang | .............. | G01R 31/318342 |
| 10,657,207 B1 * | 5/2020 | Tang | ..................... | G06F 30/333 |
| 2008/0235544 A1 * | 9/2008 | Lai | ................. | G01R 31/318547 714/729 |

(Continued)

FOREIGN PATENT DOCUMENTS

| | | |
|---|---|---|
| JP | 2004-185550 A | 7/2004 |
| JP | 2010-286383 A | 12/2010 |
| JP | 2012-099028 A | 5/2012 |

OTHER PUBLICATIONS

Brand et al., Identification of redundant delay faults, May 1994, IEEE, vol. 13, No. 3, pp. 553-565. (Year: 1994).*

(Continued)

*Primary Examiner* — John J Tabone, Jr.
(74) *Attorney, Agent, or Firm* — Fujitsu Patent Center

(57) ABSTRACT

A non-transitory computer-readable recording medium stores an analysis program for causing a computer to execute a process including: reading circuit data; trying to generate test data for a delay fault to be targeted; analyzing whether an underkill is caused when the targeted delay fault results in a redundant fault; and presenting circuit modification locations to avoid the underkill, based on an analysis result, when the underkill is caused.

18 Claims, 23 Drawing Sheets

(56) References Cited

U.S. PATENT DOCUMENTS

2009/0287974 A1* 11/2009 Kojima ............ G01R 31/31725
                                                        714/E11.155
2010/0318864 A1    12/2010 Funatsu
2017/0363685 A1*  12/2017 Douskey ........ G01R 31/318566
2018/0253346 A1*   9/2018 Tang .................... G06F 11/079
2022/0390516 A1*  12/2022 Maruyama ..... G01R 31/318525

OTHER PUBLICATIONS

Chen et al., Single-fault fault collapsing analysis in sequential logic circuits, 1990, IEEE, pp. 809-814. (Year: 1990).*
Cheng, On removing redundancy in sequential circuits, 1991, IEEE, pp. 164-169. (Year: 1991).*
Liang et al., Asequential redundant fault identification scheme and its application to test generation, 1994, IEEE, 57-62. (Year: 1994).*
Lin et al., On removing redundant faults in synchronous sequential circuits 1998, IEEE, pp. 1-8. (Year: 1998).*
Mahmod et al., Special Session: Delay Fault Testing—Present and Future, 2019, IEEE, pp. 1-10. (Year: 2019).*
Qiu et al., At-speed test for path delay faults using practical techniques 2004, IEEE, pp. 61-66. (Year: 2004).*

* cited by examiner

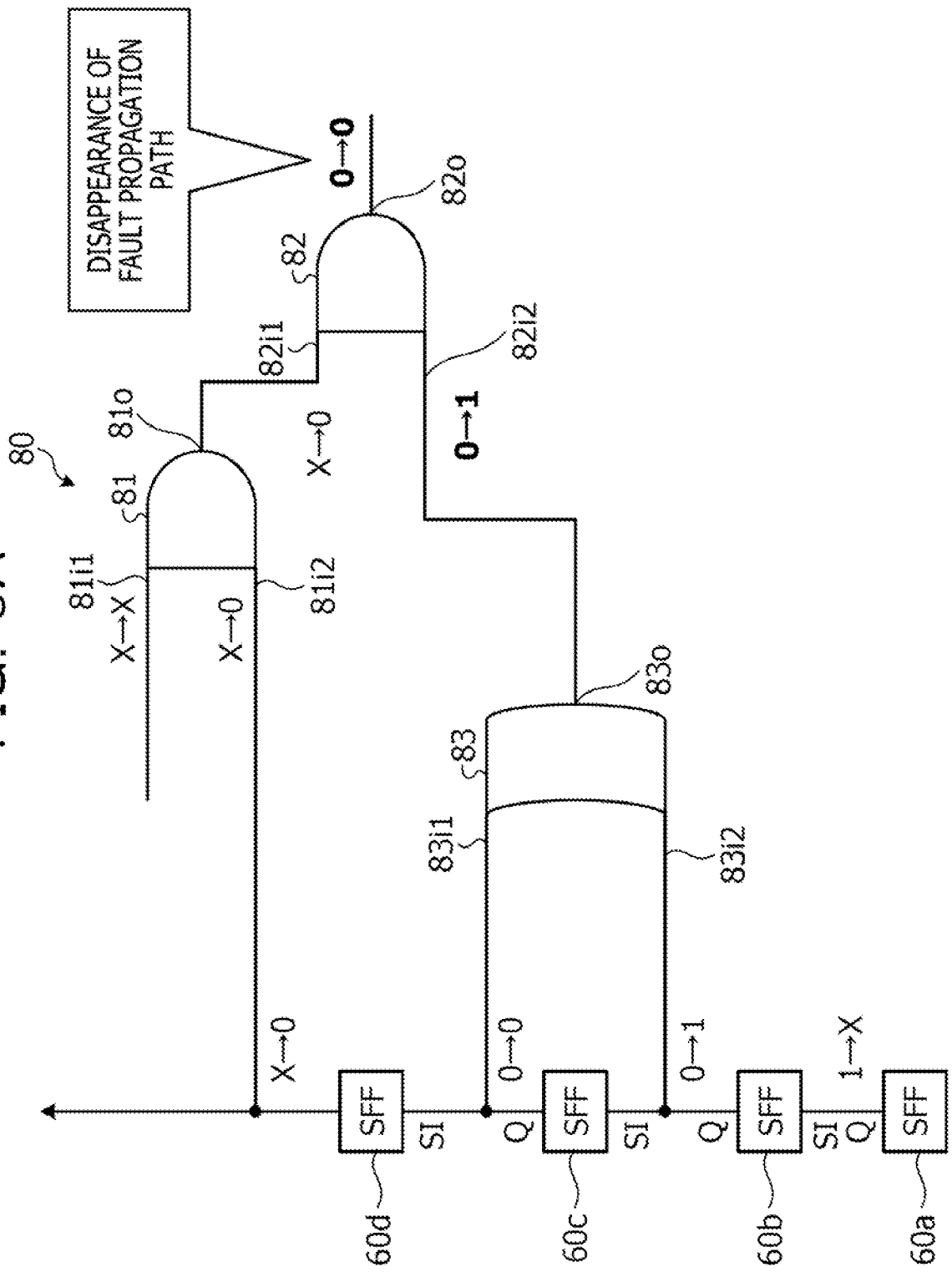

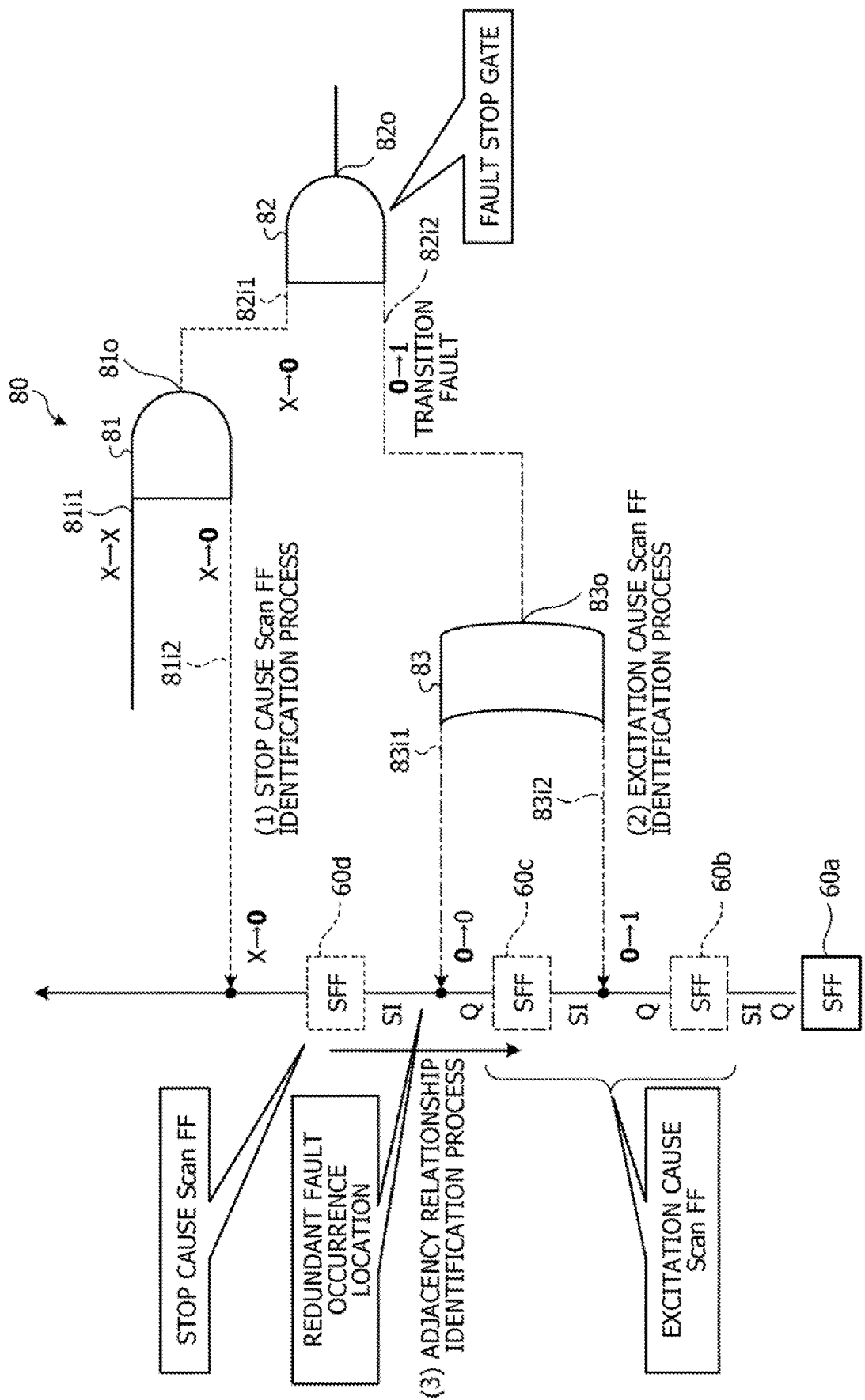

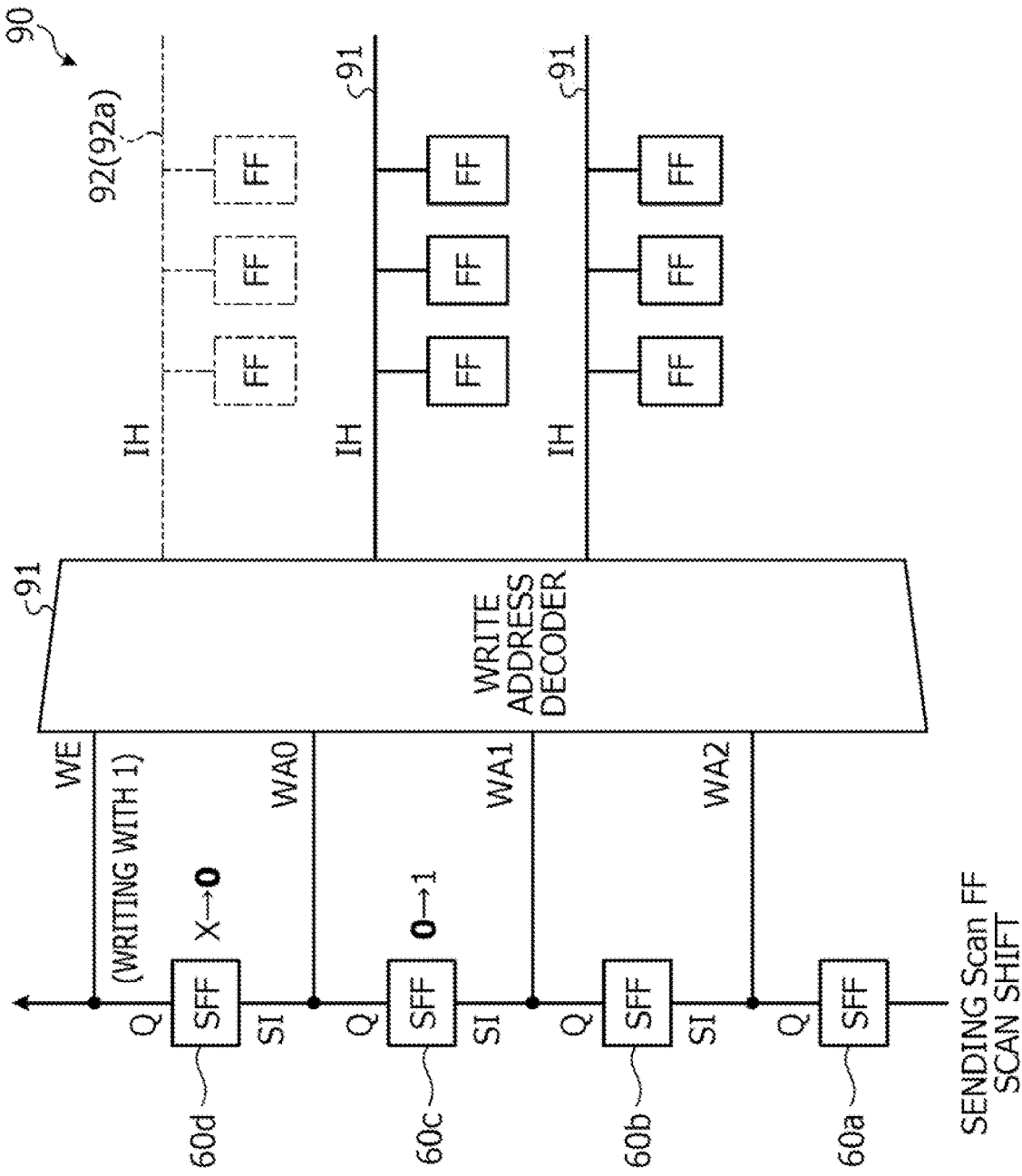

FIG. 9C

| COUNT VALUE | COUPLED SCAN FFS |
|---|---|
| N | SFF60c-SFF60d |
| 0 | SFF60a-SFF60b |
| 0 | SFF60b-SFF60c |

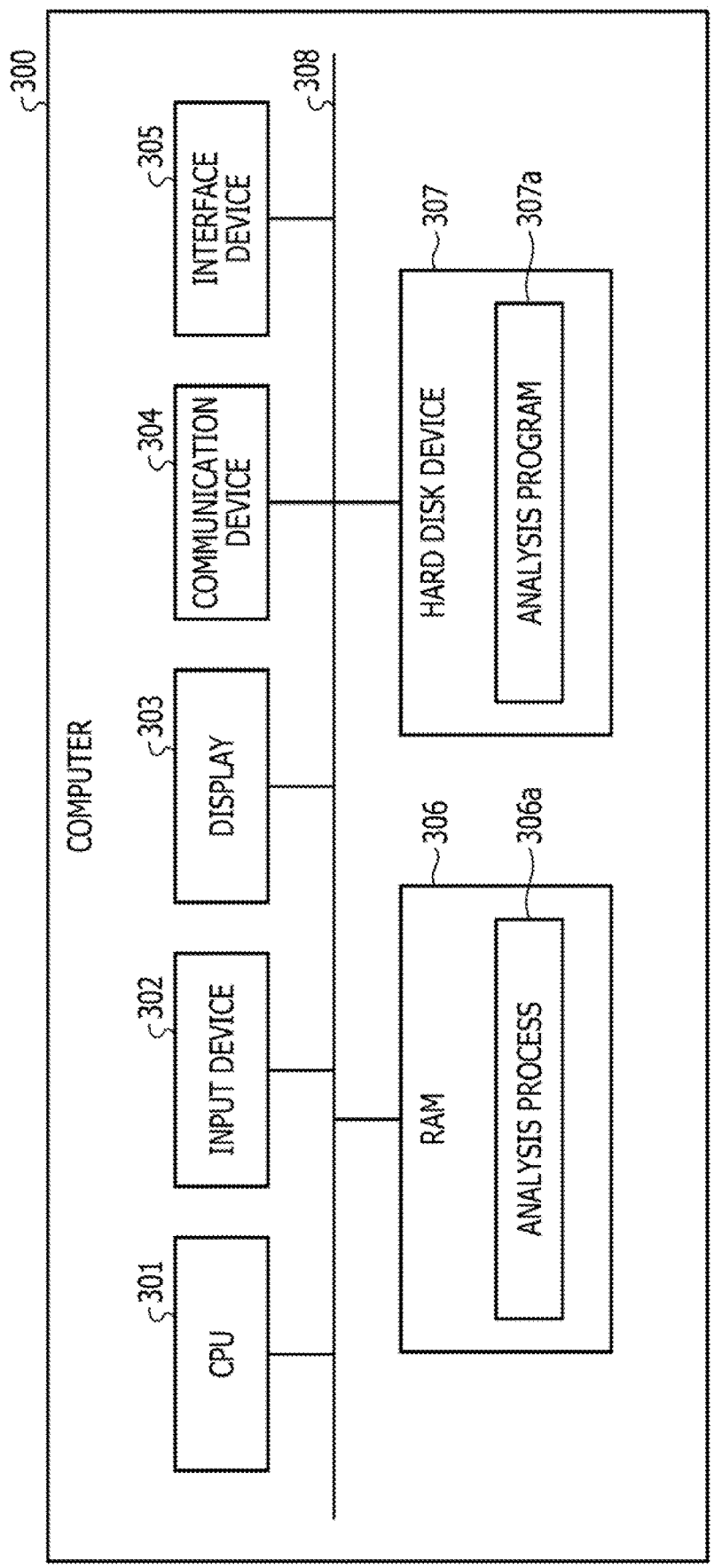

COMPUTER-READABLE RECORDING MEDIUM STORING ANALYSIS PROGRAM, ANALYSIS METHOD, AND ANALYSIS DEVICE

CROSS-REFERENCE TO RELATED APPLICATION

This application is based upon and claims the benefit of priority of the prior Japanese Patent Application No. 2021-95903, filed on Jun. 8, 2021, the entire contents of which are incorporated herein by reference.

FIELD

The embodiments discussed herein are related to an analysis program, an analysis method, and an analysis device.

BACKGROUND

In circuit design and manufacturing for a semiconductor integrated circuit (hereinafter also referred to as "LSI") or the like, the importance of a delay test is increasing as further miniaturization and higher speed are achieved. In circuit design, test data for a delay test or the like is generated by automatically generating test data using an automatic test pattern generator (ATPG) tool. There is a scan shift approach as one approach for this delay test. In the scan shift approach, the delay test is performed by causing a scan shift operation on a shift register obtained by serially connecting scan flip-flops (hereinafter also referred to as "scan FFs").

Japanese Laid-open Patent Publication No. 2012-99028, Japanese Laid-open Patent Publication No. 2004-185550, and Japanese Laid-open Patent Publication No. 2010-286383 are disclosed as related art.

SUMMARY

According to an aspect of the embodiments, a non-transitory computer-readable recording medium stores an analysis program for causing a computer to execute a process including: reading circuit data; trying to generate test data for a delay fault to be targeted; analyzing whether an underkill is caused when the targeted delay fault results in a redundant fault; and presenting circuit modification locations to avoid the underkill, based on an analysis result, when the underkill is caused.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is a diagram explaining analysis by an analysis unit according to the embodiment;

FIG. 6D is a diagram explaining analysis by the analysis unit according to the embodiment;

FIG. 9A is a diagram explaining an example of a delay test according to the embodiment;

FIG. 9C is a diagram explaining an example of a cause location count result according to the embodiment;

FIG. 10 is a diagram illustrating an example of a hardware configuration of a computer that implements functions similar to the functions of a circuit analysis/modification presentation device according to the embodiment.

DESCRIPTION OF EMBODIMENTS

In testing in the scan shift approach, a scan shift-dependent underkill sometimes occurs, and it may not be identified where in the circuit is to be modified to make it feasible to avoid the underkill.

In one aspect, it is an object to provide an analysis program, an analysis method, and an analysis device capable of presenting a modification location of a circuit for avoiding an underkill.

Hereinafter, embodiments of an analysis program, an analysis method, and an analysis device disclosed in the present application will be described in detail with reference to the drawings. Note that the embodiments do not limit the present disclosure.

[Embodiments]

Figure 1:
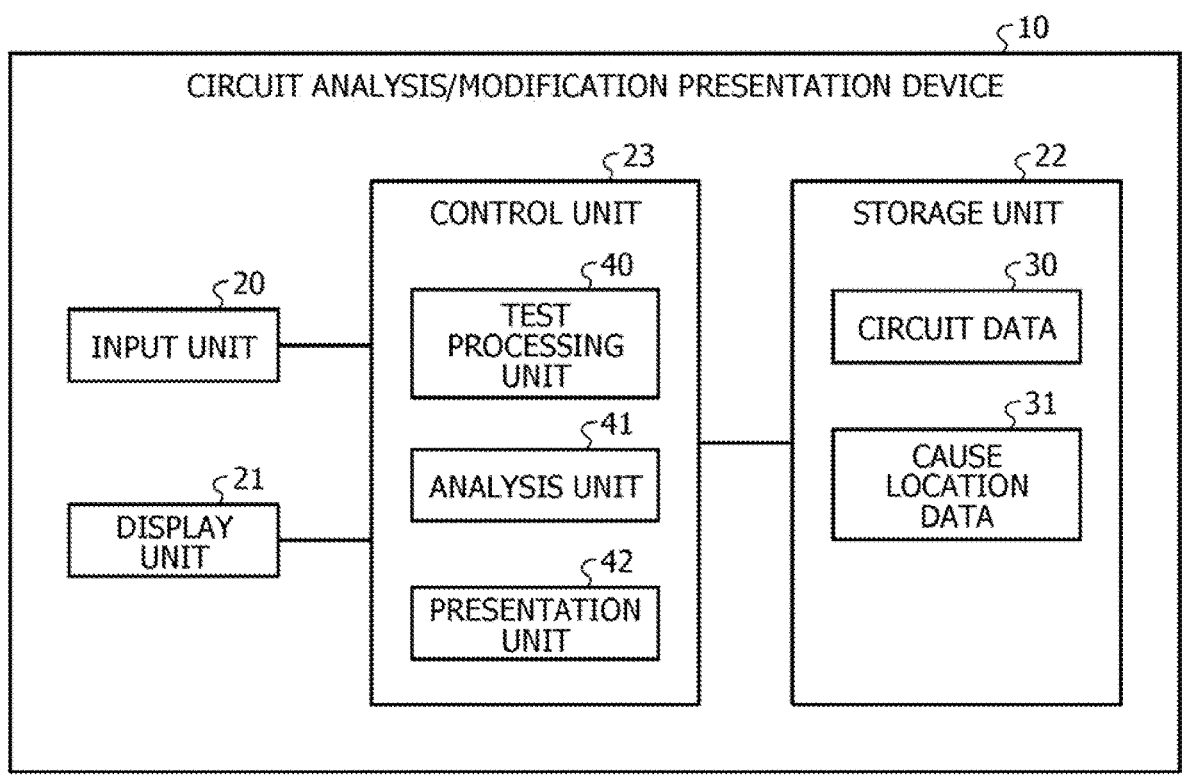
FIG. 1 is a block diagram illustrating a functional configuration of a circuit analysis/modification presentation device according to an embodiment.

An example of the configuration of a circuit analysis/modification presentation device 10 according to an embodiment will be described. In the present embodiment, the circuit analysis/modification presentation device 10 corresponds to the analysis device disclosed in the present application. FIG. 1 is a block diagram illustrating a functional configuration of the circuit analysis/modification presentation device 10 according to the embodiment. In LSI circuit design and manufacturing, circuit tests such as a delay test are carried out on a designed circuit. The circuit analysis/modification presentation device 10 is a device that carries out analysis of a redundant fault that occurs in the designed circuit and presentation of a circuit modification location. For example, the circuit analysis/modification presentation device 10 is a computer or the like, such as a personal computer or a server computer. The circuit analysis/modification presentation device 10 may also be mounted as one computer or may also be mounted as a cloud made up of a plurality of computers. In the present embodiment, a case where the circuit analysis/modification presentation device 10 is formed as one computer will be described as an example. Note that the circuit analysis/modification presentation device 10 may also be a design device such as a computer aided design (CAD) device on which circuit design software that supports circuit design by a designer operates. In addition, the circuit analysis/modification presentation device 10 may also be a server computer that is connected to a terminal device via a network such that communication is enabled, to accept various types of operation information from the terminal device and transmit a processing result according to the operation information to the terminal device. As illustrated in FIG. 1, the circuit analysis/modification presentation device 10 includes an input unit 20, a display unit 21, a storage unit 22, and a control unit 23. Note that the circuit analysis/modification presentation device 10 may also include another component apart from the above components.

The input unit 20 is an input device that inputs various types of information. Examples of the input unit 20 include input devices that accept input of operations, such as a mouse and a keyboard. The input unit 20 accepts input of various types of information. For example, the input unit 20 accepts input of various operations on a virtual hardware model. The input unit 20 inputs the operation information indicating the accepted operation contents to the control unit 23.

The display unit 21 is a display device that displays various types of information. Examples of the display unit 21 include display devices such as a liquid crystal display (LCD) and a cathode ray tube (CRT). The display unit 21 displays various types of information. For example, the display unit 21 displays various screens such as an operation screen.

The storage unit 22 is a storage device such as a hard disk, a solid state drive (SSD), and an optical disc. Note that the storage unit 22 may also be a semiconductor memory in which data is rewritable, such as a random access memory (RAM), a flash memory, and a non-volatile static random access memory (NVSRAM).

The storage unit 22 stores an operating system (OS) and various programs executed by the control unit 23. For example, the storage unit 22 stores an analysis program that executes a test process described later. Furthermore, the storage unit 22 stores various types of data used in a program executed by the control unit 23. For example, the storage unit 22 stores circuit data 30 and cause location data 31.

The circuit data 30 is data that stores various types of information regarding a circuit to be tested. For example, the circuit data 30 includes data of a designed LSI circuit. In the circuit indicated by the circuit data 30, scan FFs are connected on an input side and an output side of a path to be tested, and a scan chain forming a shift register is provided by connecting the scan FFs serially. The scan chain may also be provided by the circuit designer according to a path to be tested. In addition, the scan chain may also be automatically arranged by a design tool or a test tool according to a path to be tested.

The cause location data 31 is data that records a cause location of a fault. The details of the cause location data 31 will be described later.

The control unit 23 is a device that controls the circuit analysis/modification presentation device 10. For the control unit 23, an electronic circuit such as a central processing unit (CPU) or a micro processing unit (MPU), or an integrated circuit such as an application specific integrated circuit (ASIC) or a field programmable gate array (FPGA) may be adopted. The control unit 23 includes an internal memory for storing a program specifying various processing procedures and control data and executes a variety of processes using these program and control data. Operation of various programs causes the control unit 23 to function as various processing units. For example, the control unit 23 includes a test processing unit 40, an analysis unit 41, and a presentation unit 42. A part or all of the functions of the various processing units may also be the functions of a program that generates test data, such as an ATPG tool.

The test processing unit 40 performs various processes of a circuit test. In the present embodiment, the test processing unit 40 generates delay test data of the scan shift approach for the circuit indicated by the circuit data 30. The test processing unit 40 reads the circuit data 30 and tries to generate test data for a delay fault to be targeted. For example, the test processing unit 40 selects faults to be tested in order from the circuit indicated by the circuit data 30. The test processing unit 40 generates test data according to the selected fault to be tested. The test processing unit 40 inputs the generated test data to a scan chain corresponding to the fault to be tested and sets the test data in each scan FF of the scan chain. The test processing unit 40 inputs the test data to the fault to be tested from each scan FF of the scan chain and generates a delay test. The test processing unit 40 propagates the test data in order from each scan FF to a gate circuit provided in the fault to be tested. The gate circuit is a general term for circuits that perform logical operations, such as AND circuits, OR circuits, and NOR circuits.

Figure 2:
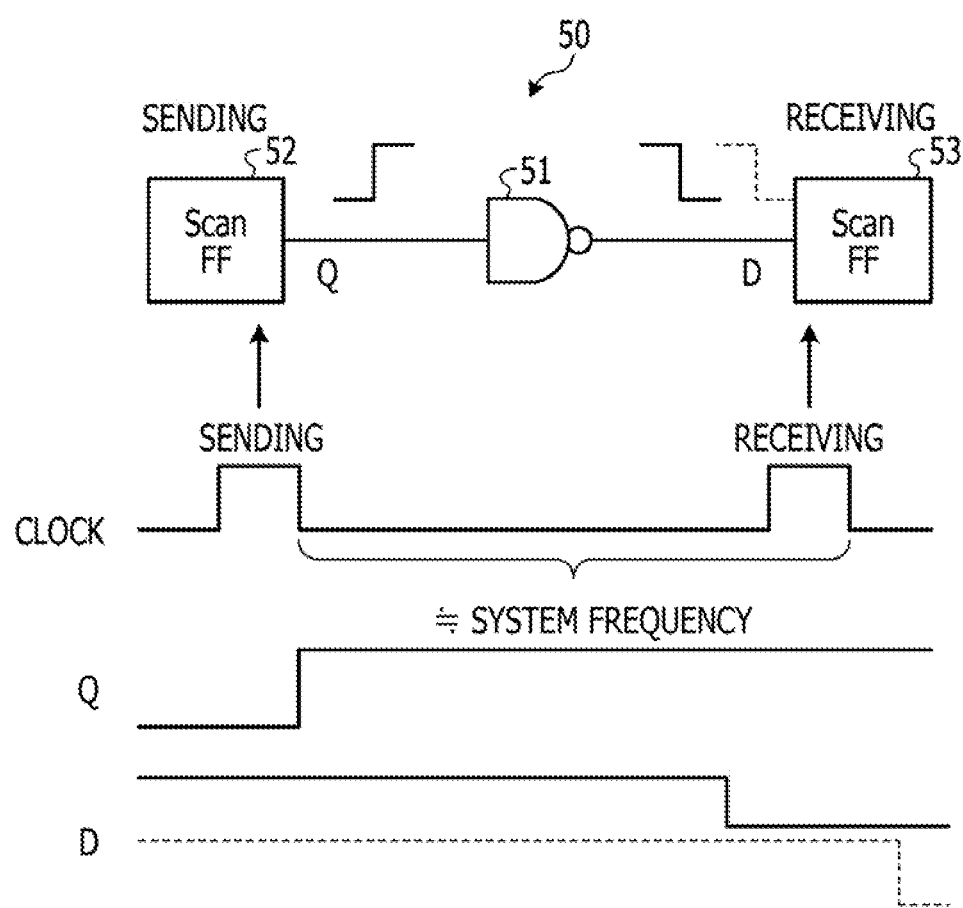
FIG. 2 is a diagram explaining a delay test.

Here, the delay test will be described. FIG. 2 is a diagram explaining a delay test. In the circuit to be tested for the delay test or the like, the scan FFs are connected on an input side and an output side of a path to be tested. Hereinafter, the scan FF on the input side is also referred to as "sending FF", and the scan FF on the output side is also referred to as "receiving FF". In FIG. 2, for simplification of the explanation, a path 50 to be tested is assumed as one not-and (NAND) circuit 51. In the NAND circuit 51, a scan FF 52 is connected on an input side and a scan FF 53 is connected on an output side. In FIG. 2, the scan FF 52 is a sending FF. The scan FF 53 is a receiving FF.

The delay test tests whether a delay in a path between scan FFs is within the system specifications. In the delay test, the scan function sets conditions for the occurrence of a change in the sending FF and the path sensitization. In the delay test, two clocks, namely, a sending clock and a receiving clock, are applied to the sending FF and the receiving FF, respectively, at a frequency close to the system frequency at which the circuit to be tested operates. In the delay test, a change (transition) that has occurred in the sending FF due to the sending clock is captured by the receiving FF with the receiving clock. In the delay test, the captured value of the receiving FF is observed by the scan function. For example, in the example in FIG. 2, a change from 0 to 1 that has occurred in the scan FF 52 due to the sending clock becomes a change from 1 to 0 by passing through the NAND circuit 51 on the path 50, and 0 is captured in the scan FF 53 with the receiving clock. At this time, if the path 50 has a delay equal to or greater than a specified level as indicated by the dotted line waveform, 1, which is different from when the normal operation is running, is captured by the scan FF 53, and thus a delay fault is detected.

In the delay test, for example, fault test data is input to a circuit, and data output from the circuit is observed to test whether the fault can be detected. Incidentally, in the delay test, a redundant fault sometimes occurs. The redundant fault is a fault in which it is infeasible to observe the effect of the fault with the output even if any pattern of test data is used.

The main test approaches for tests such as the delay test include a capture approach and a scan shift approach. The capture approach is also called the launch off capture (LOC) approach or the broad side approach. The capture approach is also called the launch off shift (LOS) approach or the skewed load approach.

Figure 3:
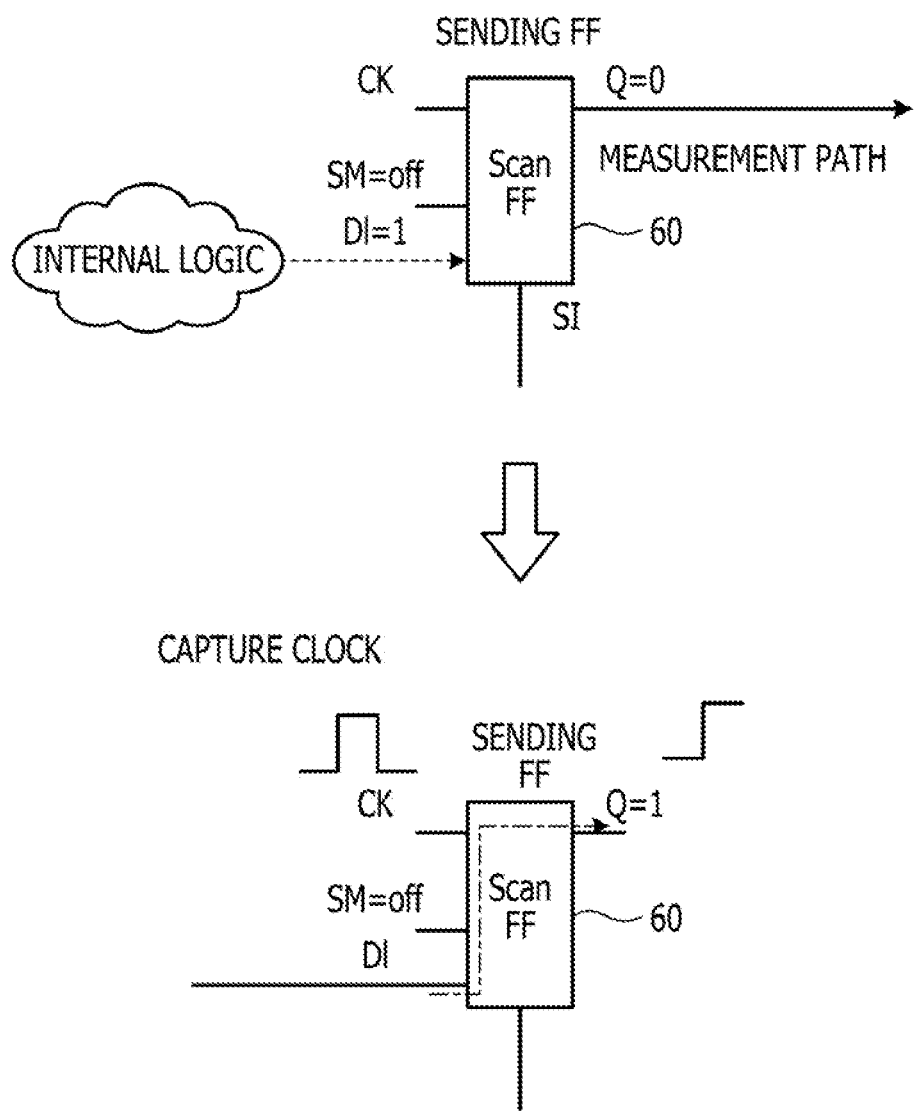
FIG. 3 is a diagram explaining a delay test of a capture approach.

FIG. 3 is a diagram explaining the delay test of the capture approach. FIG. 3 illustrates a scan FF 60. The scan FF 60 has "DI", "SI", "SM", "CK", and "Q" as input and output terminals. DI denotes a data input terminal. SI denotes a scan data input terminal. SM denotes a scan mode input terminal. CK denotes a clock input terminal. Q denotes a data output terminal. In the scan FF 60, when the clock is input to CK with SM set to OFF, data input to DI is output from Q, and when the clock is input to CK with SM set to ON, data input to SI is output from Q. Note that, since the scan FFs have a similar configuration in the following, individual description thereof will be omitted.

In the delay test of the capture approach, OFF is set in the SM of the scan FF 60, and test data is generated by the internal logic of the circuit to be tested and is input to DI. When the clock is input to CK, the scan FF 60 outputs the data input to DI from Q. In FIG. 3, "1" has been input to DI, and when the clock is input to CK, the scan FF 60 outputs "1" from Q.

The occurrence of a change in the capture approach is the same as the system operation. Therefore, the redundant fault at the time of the test of the capture approach is the same as the system operation. Accordingly, the redundant fault in the capture approach does not affect the system operation, and thus no test has to be conducted.

Figure 4:
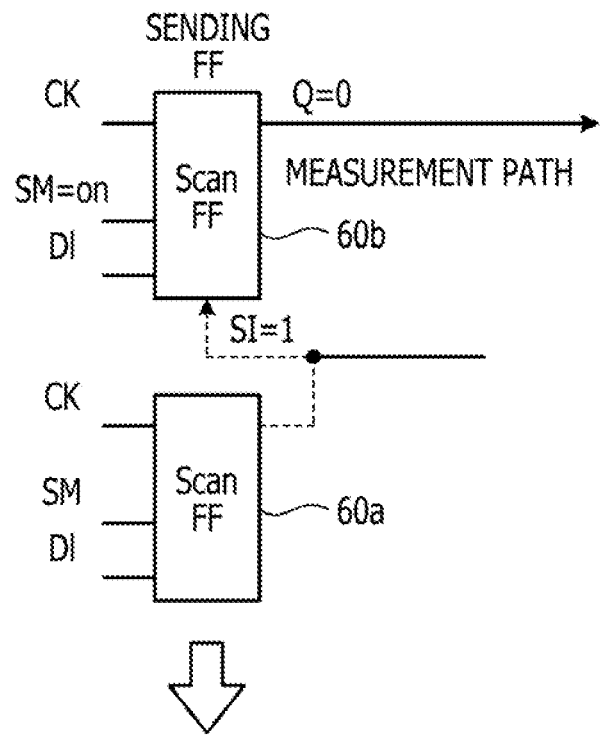
FIG. 4 is a diagram explaining a delay test of a scan shift approach.
Figure 4:
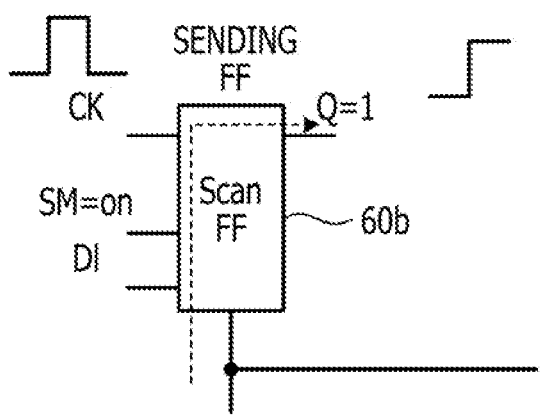

FIG. 4 is a diagram explaining the delay test of the scan shift approach. FIG. 4 illustrates scan FFs 60a and 60b on an input side. The scan FFs 60a and 60b are serially connected to constitute a scan chain by connecting Q of the scan FF 60a to SI of the scan FF 60b.

In the delay test of the scan shift approach, ON is set in SM of the scan FF 60b, test data is generated externally, and the test data is set in each of the scan FFs 60a and 60b via the scan chain. In FIG. 4, the scan FF 60a outputs "1" from Q and inputs "1" to SI of the scan FF 60b. The scan FF 60b outputs "1" from Q when the clock is input to CK.

The occurrence of a change in the scan shift approach is different from the system operation. Therefore, the redundant fault at the time of test generation in the scan shift approach is sometimes different from the system operation.

Figure 5A:
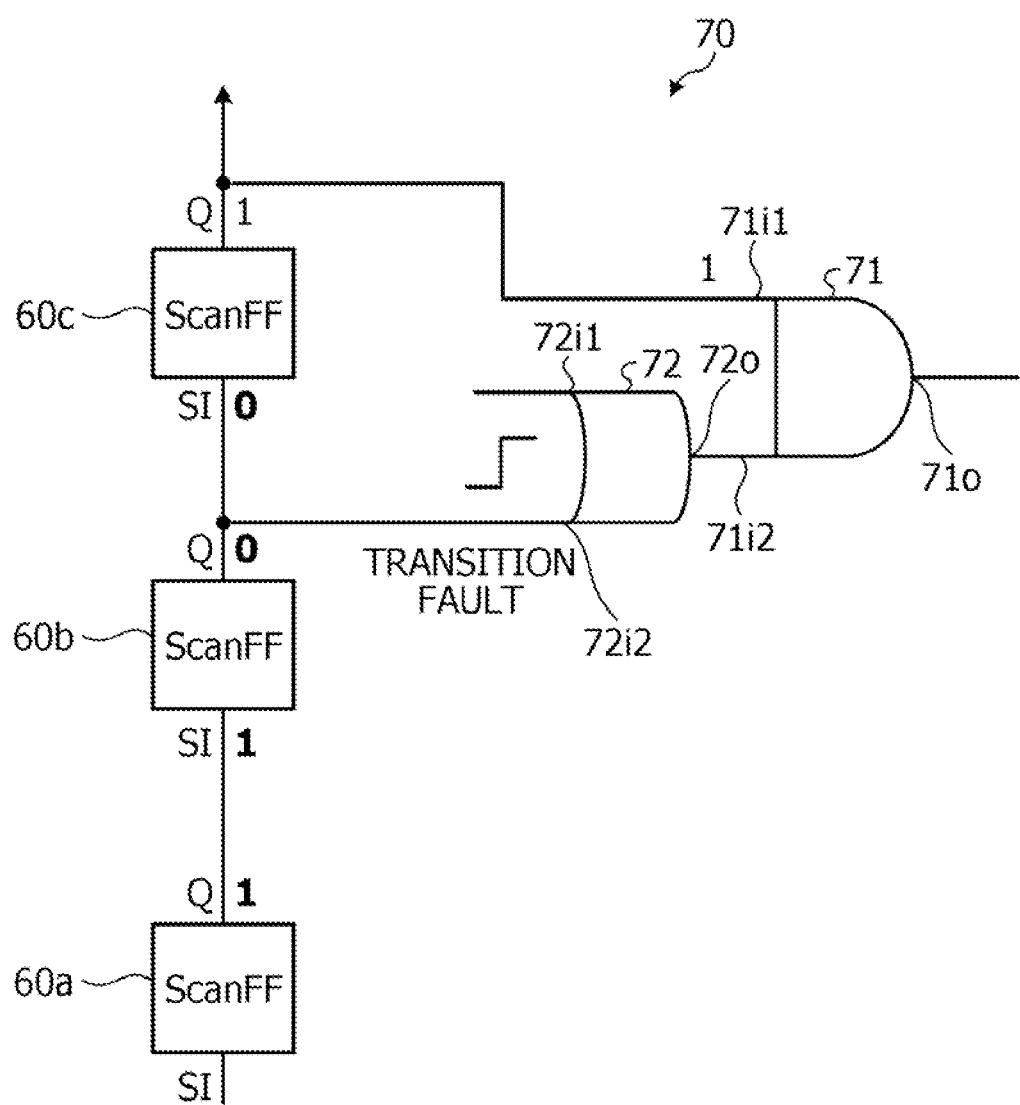
FIG. 5A is a diagram explaining the occurrence of a redundant fault in a delay test.
Figure 5B:
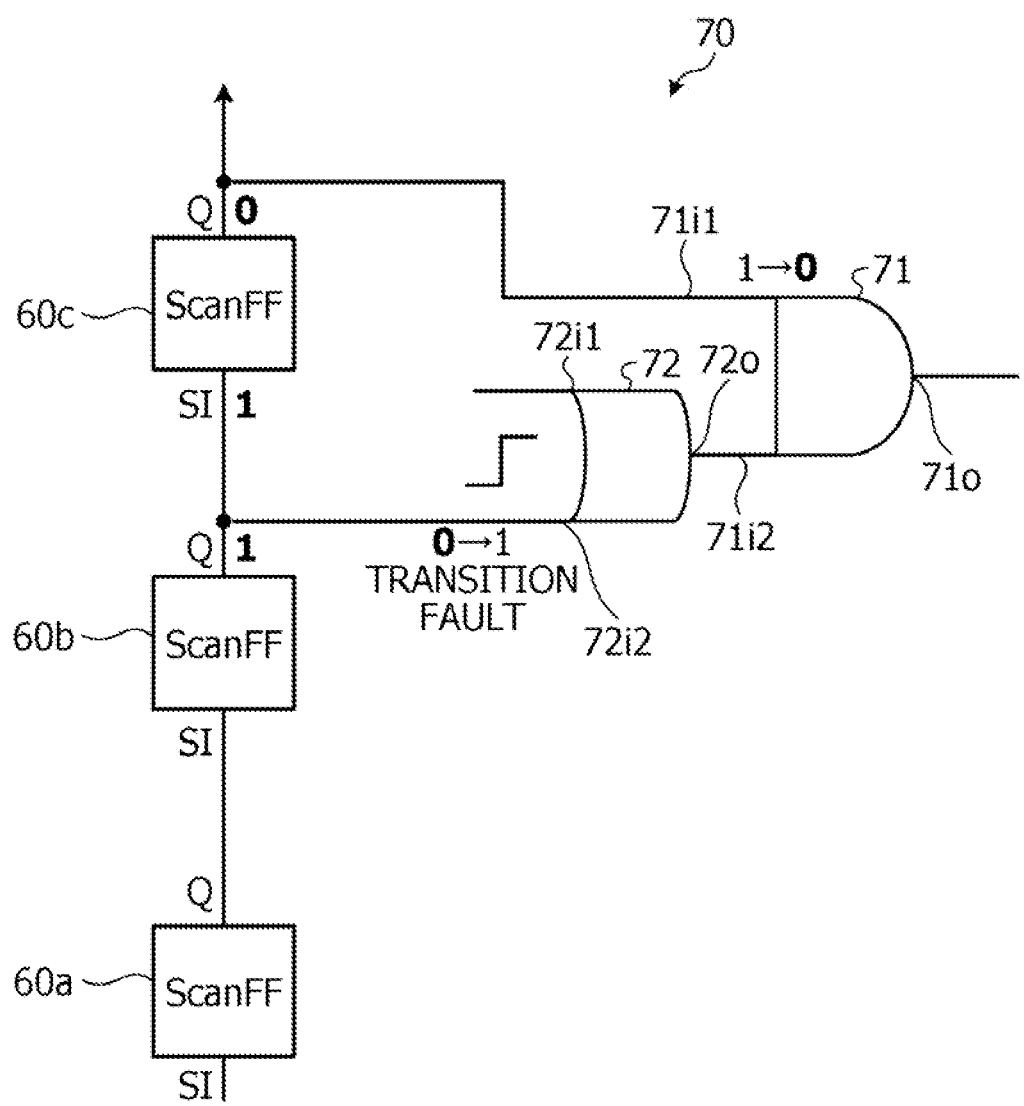
FIG. 5B is a diagram explaining the occurrence of a redundant fault in a delay test.

An example of the redundant fault will be described. FIGS. 5A and 5B are diagrams explaining the occurrence of the redundant fault in the delay test. FIGS. 5A and 5B briefly illustrate a path 70 to be tested. The path 70 to be tested is provided with an AND circuit 71 and an OR circuit 72 as gate circuits. The AND circuit 71 has input terminals 71i1 and 71i2 and an output terminal 71o. The OR circuit 72 has input terminals 72i1 and 72i2 and an output terminal 72o. In the AND circuit 71, the output terminal 72o of the OR circuit 72 is connected to the input terminal 71i2. In the scan shift approach, scan FFs are connected on an input side and an output side of the path 70 to be tested, and a scan chain forming a shift register is provided by connecting the scan FFs serially. FIGS. 5A and 5B illustrate scan FFs 60a to 60c on the input side. The scan FFs 60a to 60c are serially connected to constitute a scan chain. In FIGS. 5A and 5B, Q of the scan FF 60a is connected to SI of the scan FF 60b, and Q of the scan FF 60b is connected to SI of the scan FF 60c. In addition, Q of the scan FF 60b is connected to the input terminal 72i2 of the OR circuit 72. Q of the scan FF 60c is connected to the input terminal 71i1 of the AND circuit 71.

In the delay test of the scan shift approach, test data according to a fault to be tested is generated externally, and the test data is set in each of the scan FFs 60a to 60c via the scan chain. For example, in the path 70 to be tested, which is illustrated in FIGS. 5A and 5B, the fault to be tested is assumed as a transition fault in which the input terminal 72i2 of the OR circuit 72 transitions from 0 to 1. In this case, in order to cause the transition fault to occur, "1" is set in the scan FF 60a, and "0" is set in the scan FF 60b. In addition, for example, "1" is provisionally set in the scan FF 60c, although it is not related to the test. In FIG. 5A, the scan FF 60a outputs "1" from Q, and "1" is input to SI of the scan FF 60b. Furthermore, the scan FF 60b outputs "0" from Q, and "0" is input to SI of the scan FF 60c and the input terminal 72i2 of the OR circuit 72. Additionally, the scan FF 60c outputs "1" from Q, and "1" is input to the input terminal 71i1 of the AND circuit 71.

In the delay test, two clocks, namely, a sending clock and a receiving clock, are applied to the sending FF and the receiving FF, respectively, at a frequency close to the system frequency at which the circuit to be tested operates. Each of the scan FFs 60a to 60c in FIG. 5A transitions to the state illustrated in FIG. 5B when the clock is input. In FIG. 5B, the scan FF 60b outputs "1" from Q, and "1" is input to SI of the scan FF 60c and the input terminal 72i2 of the OR circuit 72. In addition, the scan FF 60c outputs "0" from Q, and "0" is input to the input terminal 71i1 of the AND circuit 71.

The transition from FIG. 5A to FIG. 5B causes a transition fault in which the input of the input terminal 72i2 of the OR circuit 72 transitions from 0 to 1 to occur. However, in FIG. 5B, when "0" is input to the input terminal 71i1 of the AND circuit 71 on the output side of the OR circuit 72, a stuck-at fault in which the AND circuit 71 closes the propagation of the transition fault of the OR circuit 72 occurs. The stuck-at fault is a fault in which one signal line in a circuit is fixed to 0 or 1. In the AND circuit 71, when "0" is input to the input terminal 71i1, the output of the output terminal 71o is fixed to "0" regardless of whether any of "0" and "1" is input from the OR circuit 72 to the input terminal 71i2. When such a stuck-at fault has occurred, it is infeasible to observe the effect of the fault with the output, resulting in a redundant fault.

For example, the redundant fault in the capture approach does not affect the system operation, and thus no test has to be conducted. On the other hand, the redundant fault in the scan shift approach is likely to affect the system operation, and thus a test has to be conducted.

Accordingly, in the test of the scan shift approach, when a certain fault is determined to be a redundant fault, an underkill problem in which a test that actually has to be conducted is not performed occurs if the certain fault is excluded from targets to be tested.

The description returns to FIG. 1. Thus, the analysis unit 41 analyzes whether an underkill is caused when the delay fault being targeted results in a redundant fault. For example, the analysis unit 41 analyzes whether an underkill is caused when the input test data results in a redundant fault. For example, the analysis unit 41 identifies a scan flip-flop to which data that is a cause of the redundant fault has been input. For example, the analysis unit 41 identifies a location where the stuck-at fault occurred when the test data propagated through the circuit and identifies a scan flip-flop to which data that is a cause of the stuck-at fault has been input. The analysis unit 41 stores the identified scan flip-flop as a cause location in the cause location data 31.

When an underkill is caused, the presentation unit 42 presents a circuit modification location for avoiding the underkill, based on the analysis result by the analysis unit 41. Note that the presentation unit 42 may also present the modification location on the display unit 21 or may also present the modification location on a display unit of an external device. For example, the presentation unit 42 counts the cause locations for each cause location stored in the cause location data 31 and posts the cause locations in descending order of the count values. For example, the presentation unit 42 counts the scan flip-flops for each scan flip-flop stored in the cause location data 31 as a cause location and posts the scan flip-flops in descending order of the count values.

The analysis by the analysis unit 41 will be described with reference to a specific example. First, a brief explanation of the terms used in the following description will be given.

Unique path sensitization (UPS) means to assign an input value for propagating a fault to a gate circuit with multiple input terminals when a candidate for a fault propagation path is uniquely obtained.

A control value (CV) is a value that controls the output of the gate circuit only by that value (e.g., 0 in the AND circuit with multiple input terminals).

A non-control value (NCV) is a value that does not control the output of the gate circuit only by that value (e.g., 1 in the AND circuit with multiple input terminals).

FIGS. 6A to 6D are diagrams explaining analysis by the analysis unit 41 according to the embodiment. FIGS. 6A to 6D briefly illustrate a path 80 to be tested. The path 80 to be tested is provided with AND circuits 81 and 82 and an OR circuit 83 as gate circuits. The AND circuit 81 has input terminals 81i1 and 81i2 and an output terminal 81o. The AND circuit 82 has input terminals 82i1 and 82i2 and an output terminal 82o. The OR circuit 83 has input terminals 83i1 and 83i2 and an output terminal 83o. In the AND circuit 82, the output terminal 81o of the AND circuit 81 is connected to the input terminal 82i1, and the output terminal 83o of the OR circuit 83 is connected to the input terminal 82i2. In the scan shift approach, scan FFs are connected on an input side and an output side of the path 80 to be tested, and a scan chain forming a shift register is provided by connecting the scan FFs serially. FIGS. 6A to 6D illustrate scan FFs 60a to 60d on the input side. The scan FFs 60a to 60d are serially connected to constitute a scan chain. In FIGS. 6A to 6D, Q of the scan FF 60a is connected to SI of the scan FF 60b, Q of the scan FF 60b is connected to SI of the scan FF 60c, and Q of the scan FF 60c is connected to SI of the scan FF 60d. In addition, Q of the scan FF 60b is connected to the input terminal 83i2 of the OR circuit 83. Q of the scan FF 60c is connected to the input terminal 83i1 of the OR circuit 83. Q of the scan FF 60d is connected to the input terminal 81i2 of the AND circuit 81.

The test processing unit 40 sets test data in each of the scan FFs 60a to 60d via the scan chain. Then, the test processing unit 40 inputs the clock to each of the scan FFs 60a to 60d to transition the data of each of the scan FFs 60a to 60d in order. Note that, when the data is allowed to be either "0" or "1", the data is indicated as "X".

For example, in FIG. 6A, a transition fault in which the input terminal 82i2 of the AND circuit 82 transitions from 0 to 1 is caused to occur. In this case, the scan FF 60a transitions from "1" to "X", the scan FF 60b transitions from "0" to "1", the scan FF 60c transitions from "0" to "0", and the scan FF 60d transitions from "X" to "0". Consequently, in the OR circuit 83, the input terminal 83i2 becomes "1" from "0", and the input terminal 83i1 becomes "0" from "0", which transitions the output terminal 83o from "0" to "1". In the AND circuit 81, the input terminal 81i2 becomes "0" from "X", which transitions the output terminal 81o from "X" to "0". In the AND circuit 82, since the input terminal 82i1 becomes "0" from "X", the output terminal 82o becomes "0" from "0" even if the input terminal 82i2 becomes "1" from "0", which causes a redundant fault in which the fault propagation path through which the fault is propagated disappears to occur.

Since the state of the data propagated to the circuit is managed during the test, the test processing unit 40 can recognize where in the circuit the fault propagation disappeared. The test processing unit 40 determines whether or not a redundant fault has occurred during the test. The test processing unit 40 determines that a redundant fault has occurred when the fault propagation path has disappeared. For example, when the test processing unit 40 is using the function of the ATPG tool, it is determined in the ATPG tool that a redundant fault has occurred when the UPS fails. The occurrence of "UPS failure" is determined in the ATPG tool by the disappearance of all the fault propagation paths as a result of the implications of mandatory assignments such as fault excitation and unique path sensitization. Since the ATPG tool properly manages the gate circuits and the states in which the implications propagated, it is possible to recognize in which gate circuit the fault propagation disappeared.

The analysis unit 41 analyzes whether an underkill is caused when the input test data results in a redundant fault. For example, the analysis unit 41 identifies a scan FF to which data that is a cause of the redundant fault has been input. For example, the analysis unit 41 identifies a location where the stuck-at fault occurred when the test data propagated through the circuit and identifies a scan FF to which data that is a cause of the stuck-at fault has been input.

For example, FIG. 6A illustrates a situation in which the UPS has failed because, for a 0 transition fault in the input terminal 82i2 of the AND circuit 82, the input terminal 82i1, which is other than the input terminal 82i2 of the AND circuit 82, implies 0, which is a CV, at a receiving time point. In FIG. 6A, a stuck-at fault has occurred in the AND circuit 82, and a redundant fault has occurred.

Figure 6B:
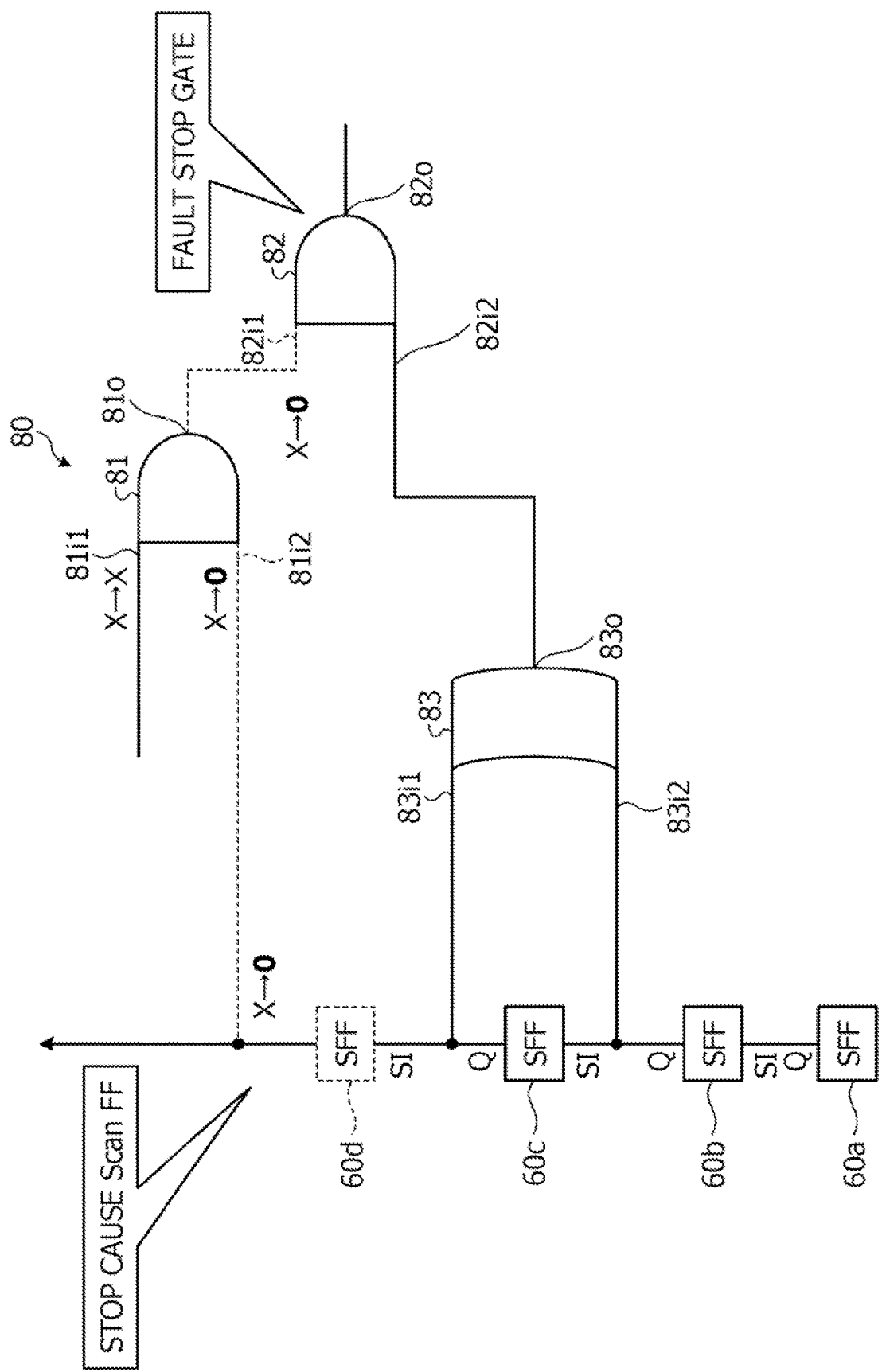
FIG. 6B is a diagram explaining analysis by the analysis unit according to the embodiment.

The analysis unit 41 identifies the AND circuit 82 as the location where the stuck-at fault has occurred because the fault propagation path through which the fault is propagated has disappeared in the AND circuit 82 and the stuck-at fault has occurred. The analysis unit 41 identifies a scan FF that is a cause of the fault stop. At the receiving time point, the analysis unit 41 sequentially performs backward tracing on the input terminals that define the output of the corresponding gate circuit in which the stuck-at fault occurred, from the gate circuit, thereby identifying the scan FF that is a cause of the fault stop. The receiving time point is a time point when the fault propagation path disappeared and is a time point when the stuck-at fault occurred. For example, as illustrated in FIG. 6B, the analysis unit 41 performs a backward trace from the AND circuit 82 identified as the location where the stuck-at fault occurred, to the AND circuit 81 in the middle. The analysis unit 41 identifies the scan FF 60d as the scan FF that is a cause of the fault stop.

Figure 6C:
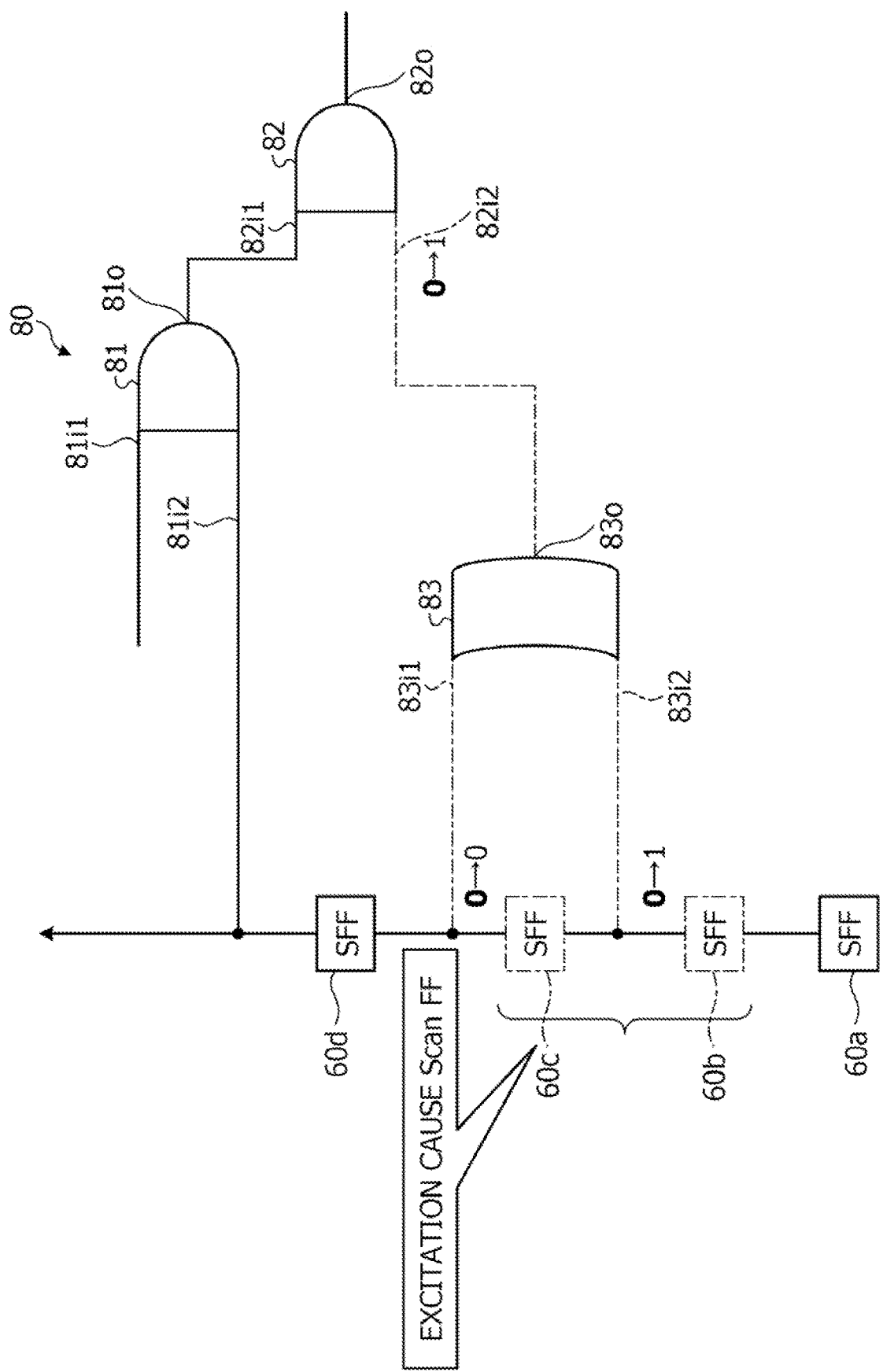
FIG. 6C is a diagram explaining analysis by the analysis unit according to the embodiment.

In addition, the analysis unit 41 identifies the scan FF that is a cause of the fault excitation. At a sending time point, the analysis unit 41 sequentially performs backward tracing on the fault propagation path through which the fault propagated, from the gate circuit in which the stuck-at fault occurred to identify the scan FF that is a cause of the fault excitation. The sending time point is a time point of a data state in which the fault propagation path has not disappeared immediately before the fault propagation path disappears and is a time point of a data state immediately before the fault stops. For example, as illustrated in FIG. 6C, the analysis unit 41 performs a backward trace from the AND circuit 82 identified as the location where the stuck-at fault occurred, to the OR circuit 83 along a propagation path through which data in the 0 state of the transition fault propagated immediately before the fault stopped. The analysis unit 41 identifies the scan FFs 60b and 60c as the scan FFs that are causes of the fault excitation.

The analysis unit 41 determines whether the cause of the redundant fault is related to a scan shift. For example, the analysis unit 41 determines whether the scan FF that is a cause of the fault stop and the scan FF that is a cause of the fault excitation are adjacent to each other in the scan chain. When there is only one scan FF that is a cause of the fault stop, the analysis unit 41 performs backward tracing on the scan chain from the corresponding scan FF that is the cause of the fault stop to determine whether the scan FF that is the cause of the fault stop and the scan FF that is a cause of the fault excitation are adjacent to each other. In addition, when there is a plurality of scan FFs that are causes of the fault stop, the analysis unit 41 performs backward tracing on the scan chain from all the scan FFs that are causes of the fault stop to determine whether the scan FFs that are causes of the fault stop and the scan FF that is a cause of the fault excitation are adjacent to each other. When the scan FF that is a cause of the fault stop and the scan FF that is a cause of the fault excitation are adjacent to each other in the scan chain, the analysis unit 41 determines that the cause of the redundant fault is related to the scan shift and an underkill is caused. When it is determined that the cause of the redundant fault is related to the scan shift and an underkill is caused, the analysis unit 41 stores the scan FF that is a cause of the fault stop and the scan FF that is a cause of the fault excitation, which have an adjacency relationship, in the cause location data 31 as cause locations. For example, as illustrated in FIG. 6D, the analysis unit 41 determines that an underkill is caused, when the scan FF 60d that is a cause of the fault stop and the scan FF 60c that is a cause of the fault excitation are adjacent to each other. The analysis unit 41 stores the scan FF 60d and the scan FF 60c in the cause location data 31 as cause locations.

Figure 7:
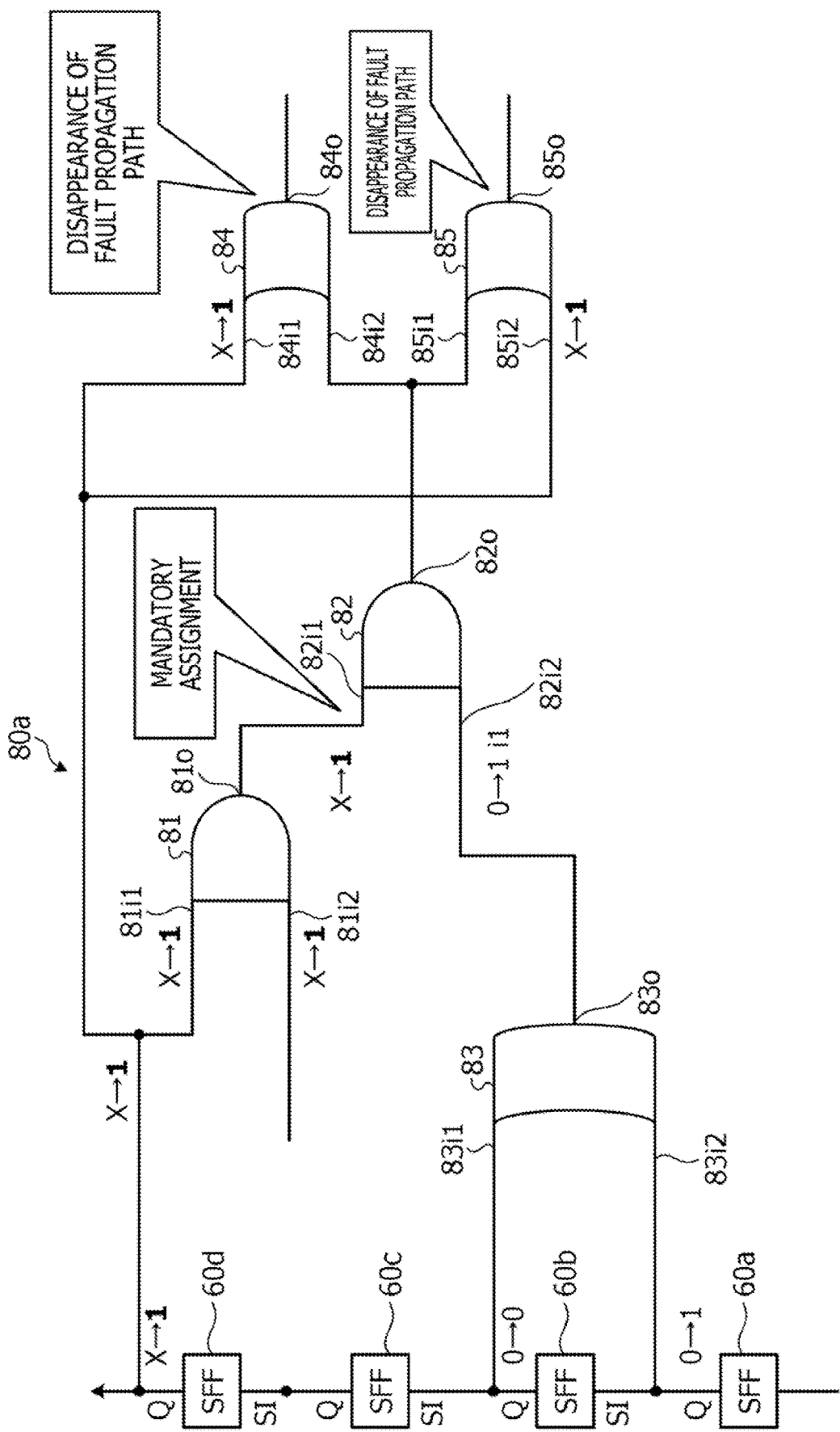
FIG. 7 is a diagram illustrating an example of a path to be tested according to the embodiment.

FIG. 7 is a diagram illustrating an example of a path 80a to be tested according to the embodiment. FIG. 7 illustrates an example of a case where the scan FF that is a cause of the fault stop and the scan FF that is a cause of the fault excitation have no adjacency relationship. FIG. 7 briefly illustrates the path 80a to be tested, which is obtained by altering a part of the path 80 to be tested in FIG. 6. The path 80a to be tested is further provided with OR circuits 84 and 85 as gate circuits. The OR circuit 84 has input terminals 84i1 and 84i2 and an output terminal 84o. The OR circuit 85 has input terminals 85i1 and 85i2 and an output terminal 85o. In the AND circuit 82, the output terminal 81o of the AND circuit 81 is connected to the input terminal 82i1, and the output terminal 83o of the OR circuit 83 is connected to the input terminal 82i2. In addition, in the OR circuit 84, the output terminal 82o of the AND circuit 82 is connected to the input terminal 84i2. In the OR circuit 85, the output terminal 82o of the AND circuit 82 is connected to the input terminal 85i1. In the scan shift approach, scan FFs are connected on an input side and an output side of the path 80a to be tested, and a scan chain forming a shift register is provided by connecting the scan FFs serially. FIG. 7 illustrates scan FFs 60a and 60d on an input side. The scan FFs 60a to 60d are serially connected to constitute a scan chain. In FIG. 7, Q of the scan FF 60a is connected to SI of the scan FF 60b, Q of the scan FF 60b is connected to SI of the scan FF 60c, and Q of the scan FF 60c is connected to SI of the scan FF 60d. In addition, Q of the scan FF 60a is connected to the input terminal 83i2 of the OR circuit 83. Q of the scan FF 60b is connected to the input terminal 83i1 of the OR circuit 83. Q of the scan FF 60d is connected to the input terminal 81i1 of the AND circuit 81, the input terminal 84i1 of the OR circuit 84, and the input terminal 85i2 of the OR circuit 85.

FIG. 7 illustrates an example of transitions of the states of the scan FFs 60a to 60d when a transition fault in which the input terminal 82i2 of the AND circuit 82 transitions from 0 to 1 is caused to occur. In FIG. 7, a transition fault in which the input terminal 82i2 of the AND circuit 82 transitions from 0 to 1 has occurred. Also in FIG. 7, since the fault propagation path disappeared, a redundant fault has occurred. In the case of FIG. 7, the analysis unit 41 identifies the scan FF that is a cause of the fault stop as the scan FF 60d. In addition, the analysis unit 41 identifies the scan FF that is a cause of the fault excitation as the scan FFs 60a and 60b. Since the scan FFs 60a and 60b and the scan FF 60d have no adjacency relationship, the analysis unit 41 determines that the cause of the redundant fault is not related to the scan shift. The cause of the redundant fault in FIG. 7 is the assignment of data to the scan FFs 60a to 60d by the UPS, and the scan shift is not the cause. Performing a test for such a redundant fault causes an overkill.

Figure 8A:
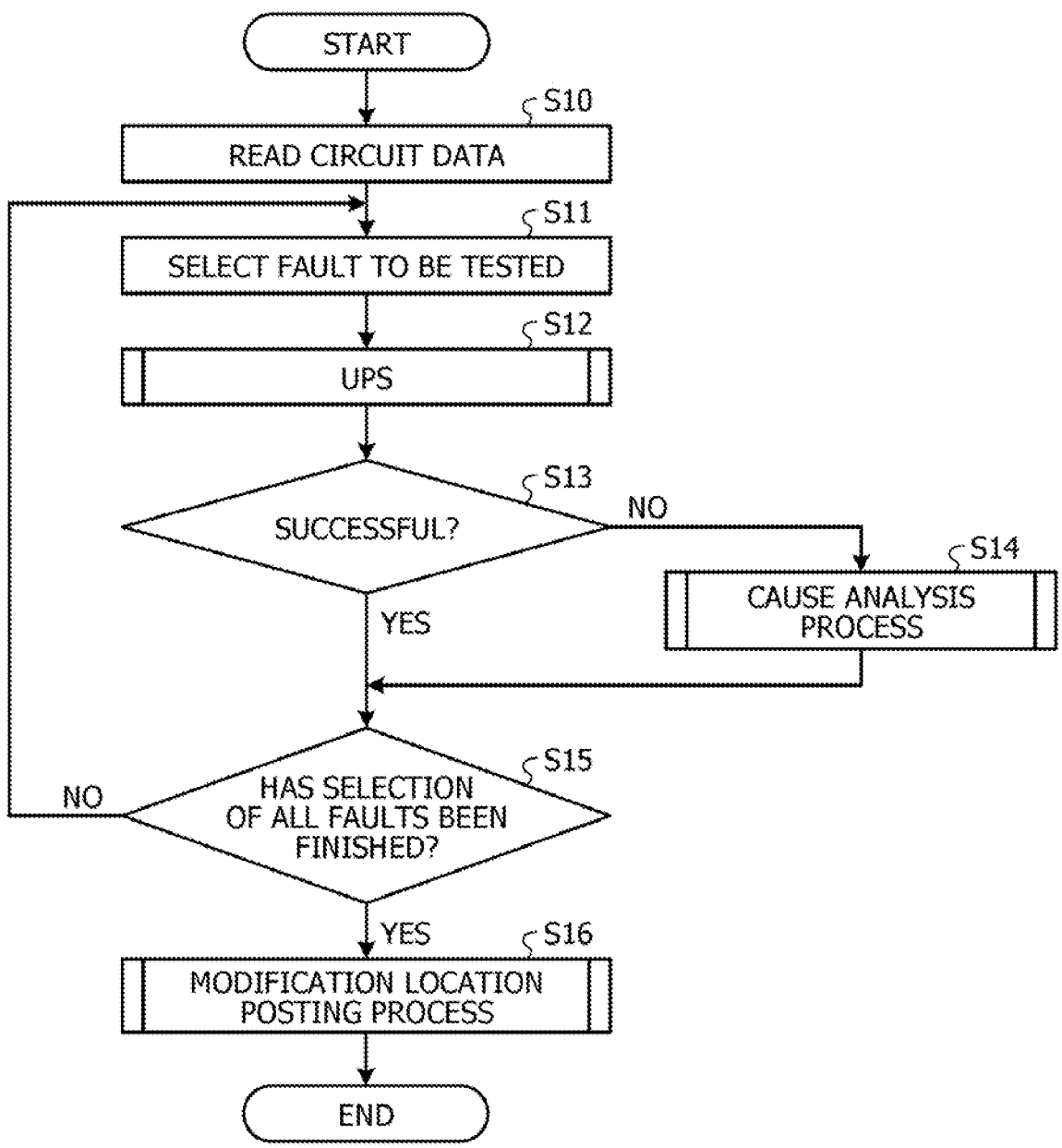
FIG. 8A is a flowchart illustrating an example of the procedure of a test process according to the embodiment.

Next, a flow of the test process in which the circuit analysis/modification presentation device 10 according to the present embodiment performs a circuit test such as a delay test and analysis processing of the present disclosure on a circuit will be described with reference to FIGS. 8A to 8F. FIG. 8A is a flowchart illustrating an example of the procedure of the test process according to the embodiment. This test process is executed at a predetermined timing, for example, at a timing when the circuit data 30 to be tested is designated by an administrator and a predetermined operation for instructing to start the test is made.

As illustrated in FIG. 8A, the test processing unit 40 reads the circuit data 30 to be tested (S10). The test processing unit 40 selects a fault to be tested from a circuit indicated by the circuit data 30 (S11). In the circuit indicated by the circuit data 30, scan FFs are connected on an input side and an output side of the fault to be tested, and a scan chain forming a shift register is provided by connecting the scan FFs serially.

The test processing unit 40 performs the UPS for the selected fault to be tested and assigns an input value for propagating the fault to the gate circuit with multiple input terminals on a path to be tested (S12). For example, the test processing unit 40 generates test data with the input value to be assigned to each scan FF on the input side of the path to be tested and inputs the generated test data to the scan chain to set the input value of the test data to each scan FF of the scan chain. Then, the test processing unit 40 inputs data from each scan FF of the scan chain to the path to be tested to generate delay test data. The test processing unit 40 propagates the data in order from each scan FF to a gate circuit provided in the path to be tested.

The analysis unit 41 determines whether or not the UPS is successful (S13). For example, the analysis unit 41 determines that the UPS has failed when the fault propagation path has disappeared or when a redundant fault has occurred.

When the UPS has fails due to the occurrence of a redundant fault (S13: No), the analysis unit 41 carries out a cause analysis process that analyzes the cause of the redundant fault (S14).

Figure 8B:
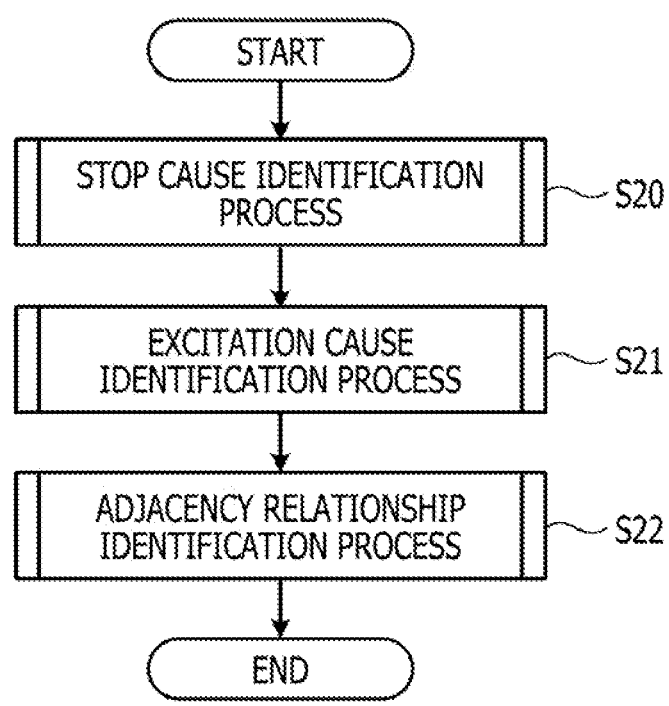
FIG. 8B is a flowchart illustrating an example of the procedure of a cause analysis process according to the embodiment.

Here, a flow of the cause analysis process will be described. FIG. 8B is a flowchart illustrating an example of the procedure of the cause analysis process according to the embodiment. This cause analysis process is executed from S12 of the test process.

As illustrated in FIG. 8B, the analysis unit 41 carries out a stop cause identification process that identifies the scan FF that is a cause of the fault stop (S20). Next, the analysis unit 41 carries out an excitation cause identification process that identifies the scan FF that is a cause of the fault excitation (S21). Subsequently, the analysis unit 41 carries out an adjacency relationship identification process that identifies whether the scan FF that is a cause of the fault stop and the scan FF that is a cause of the fault excitation are adjacent to each other (S22) and, when the process is completed, proceeds to S15 of the test process illustrated in FIG. 8A.

Figure 8C:
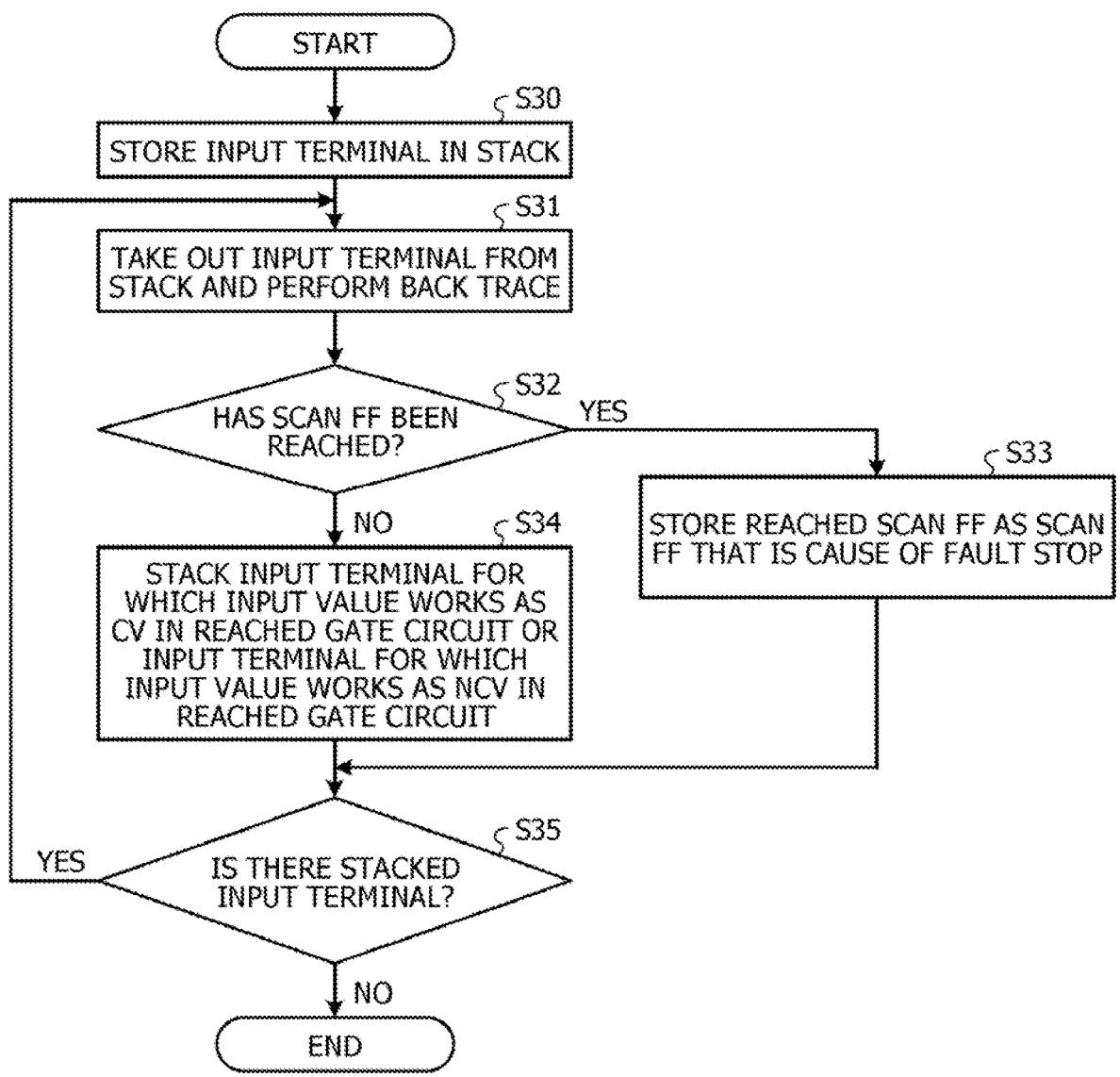
FIG. 8C is a flowchart illustrating an example of the procedure of a stop cause identification process according to the embodiment.

Next, a flow of the stop cause identification process will be described. FIG. 8C is a flowchart illustrating an example of the procedure of the stop cause identification process according to the embodiment. This stop cause identification process is executed from S20 of the cause analysis process illustrated in FIG. 8B.

As illustrated in FIG. 8C, the analysis unit 41 stores an input terminal for which a value that has been input works as a CV in the gate circuit in which the fault stop occurred, in a stack at the receiving time point (S30).

The analysis unit 41 takes out one input terminal from the stack and performs backward tracing on the circuit from the taken-out input terminal (S31).

The analysis unit 41 determines whether or not a scan FF has been reached, as a result of the backward trace (S32). When a scan FF has been reached (S32: Yes), the analysis unit 41 stores the reached scan FF as the scan FF that is a cause of the fault stop (S33).

On the other hand, when no scan FF has been reached (S32: No), the analysis unit 41 stacks an input terminal for which a value that has been input works as a CV in the reached gate circuit when there is an input terminal for which the value works as a CV and, when there is no input terminal for which the value works as a CV, stacks an input terminal for which the value works as an NCV (S34).

The analysis unit 41 determines whether or not there is a stacked input terminal (S35). When there is a stacked input terminal (S35: Yes), the process proceeds to S31 described above.

On the other hand, when all the input terminals have been taken out from the stack and there is no stacked input terminal (S35: No), the stop cause identification process is completed, and the process proceeds to S21 of the cause analysis process illustrated in FIG. 8B.

Figure 8D:
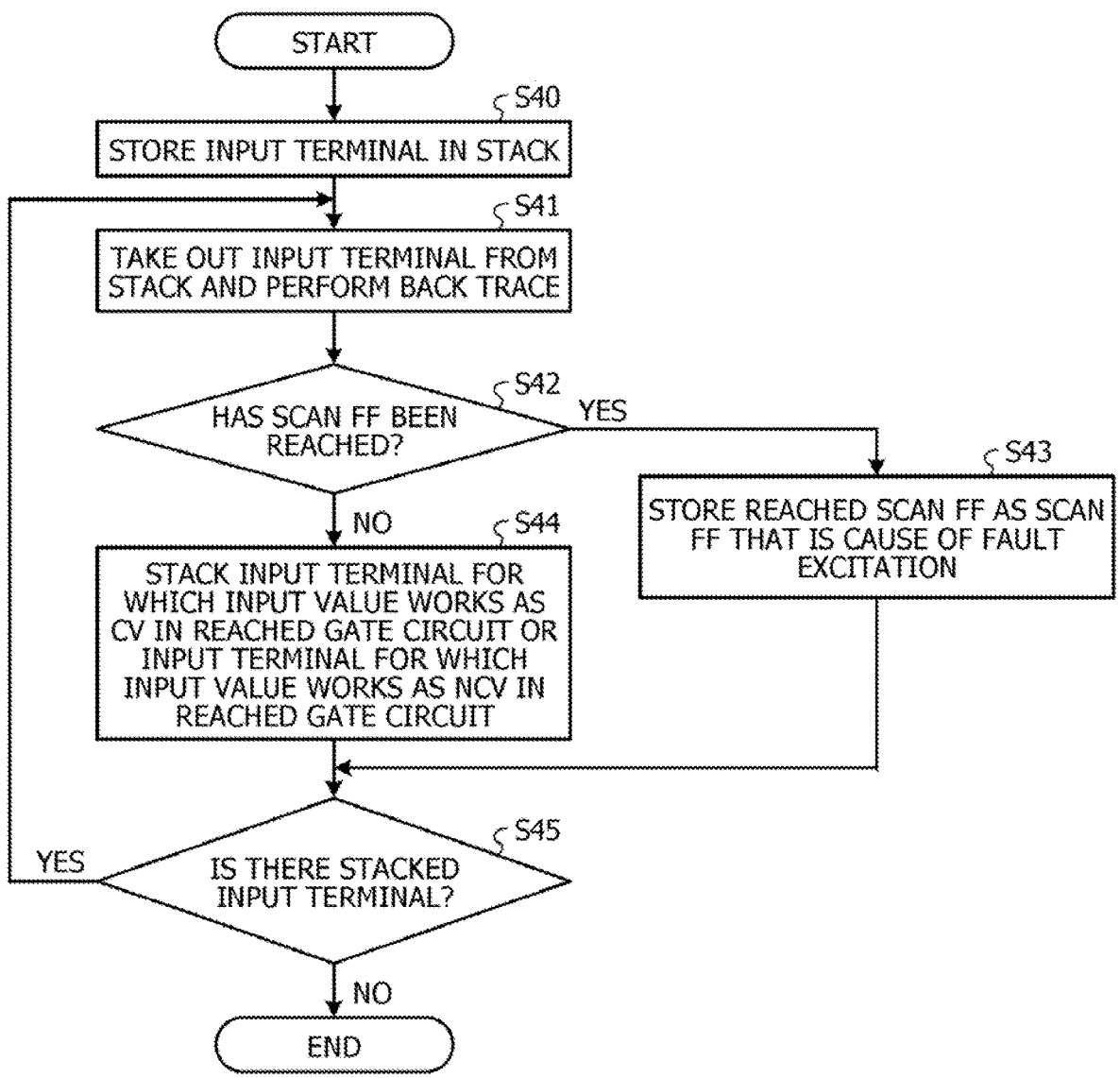
FIG. 8D is a flowchart illustrating an example of the procedure of an excitation cause identification process according to the embodiment.

Next, a flow of the excitation cause identification process will be described. FIG. 8D is a flowchart illustrating an example of the procedure of the excitation cause identification process according to the embodiment. This excitation cause identification process is executed from S21 of the cause analysis process illustrated in FIG. 8B.

As illustrated in FIG. 8D, the analysis unit 41 stores an input terminal of the gate circuit in which the fault stop occurred, through which the fault propagated, in the stack at the sending time point (S40).

The analysis unit 41 takes out one input terminal from the stack and performs backward tracing on the circuit from the input terminal (S41).

The analysis unit 41 determines whether or not a scan FF has been reached, as a result of the backward trace (S42). When a scan FF has been reached (S42: Yes), the analysis unit 41 stores the reached scan FF as the scan FF that is a cause of the fault excitation (S43).

On the other hand, when no scan FF has been reached (S42: No), the analysis unit 41 stacks an input terminal for which a value that has been input works as a CV in the reached gate circuit when there is an input terminal for which the value works as a CV and, when there is no input terminal for which the value works as a CV, stacks an input terminal for which the value works as an NCV (S44).

The analysis unit 41 determines whether or not there is a stacked input terminal (S45). When there is a stacked input terminal (S45: Yes), the process proceeds to S41 described above.

On the other hand, when all the input terminals have been taken out from the stack and there is no stacked input terminal (S45: No), the excitation cause identification process is completed, and the process proceeds to S22 of the cause analysis process illustrated in FIG. 8B.

Figure 8E:
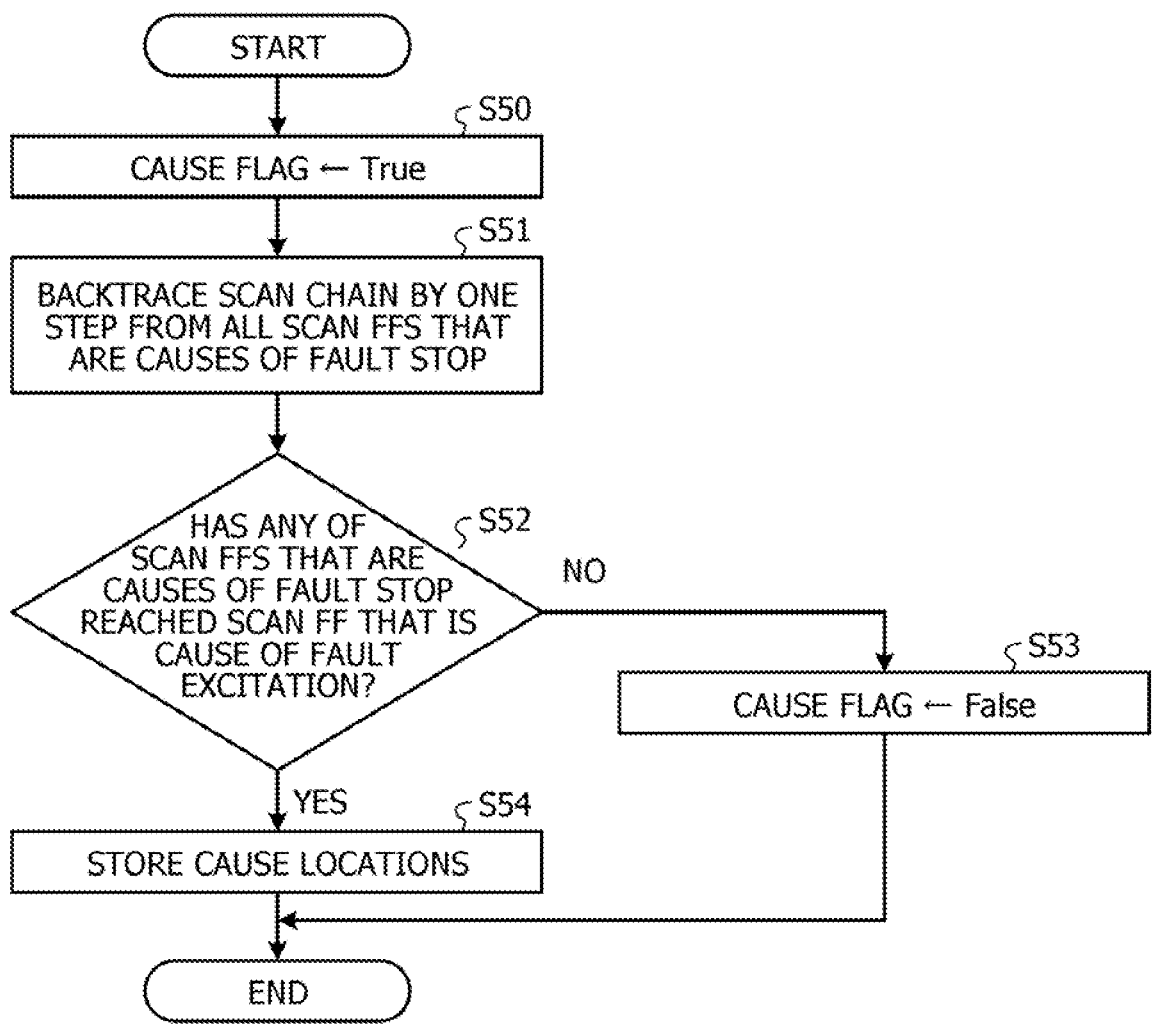
FIG. 8E is a flowchart illustrating an example of the procedure of an adjacency relationship identification process according to the embodiment.

Next, a flow of the adjacency relationship identification process will be described. FIG. 8E is a flowchart illustrating an example of the procedure of the adjacency relationship identification process according to the embodiment. This adjacency relationship identification process is executed from S22 of the cause analysis process illustrated in FIG. 8B.

As illustrated in FIG. 8E, the analysis unit 41 sets True in a cause flag (S50). The cause flag indicates that the cause of the fault stop is related to the scan shift in the case of True and that the cause of the fault stop is not related to the scan shift in the case of False.

The analysis unit 41 performs backward tracing on the scan chain by one step separately for all the stored scan FFs that are causes of the fault stop (S51).

The analysis unit 41 determines whether or not any of the scan FFs that are causes of the fault stop has reached the stored scan FF that is a cause of the fault excitation, as a result of the backward trace (S52). When none of the scan FFs that are causes of the fault stop has reached the scan FF that is a cause of the fault excitation (S52: No), the analysis unit 41 sets False in the cause flag (S53) and determines that the cause of the redundant fault is not the scan shift.

On the other hand, when any of the scan FFs that are causes of the fault stop has reached the scan FF that is a cause of the fault excitation (S52: Yes), the analysis unit 41 stores the scan FF that is a cause of the fault stop and the scan FF that is a cause of the fault excitation in the cause location data 31 as cause locations (S54). In this case, since the cause flag remains True, the analysis unit 41 determines that the cause of the redundant fault is related to the scan shift and an underkill is caused. The adjacency relationship identification process completes the processing after S53 and S54, and the process proceeds to S15 of the test process illustrated in FIG. 8A.

The description returns to FIG. 8A. When the UPS is successful (S13: Yes) and the cause analysis process is completed, the test processing unit 40 determines whether or not all the faults to be tested have been selected (S15). When there is an unselected fault to be tested (S15: No), the process proceeds to S11 described above.

On the other hand, when all the faults to be tested have been selected (S15: Yes), the presentation unit 42 carries out a modification location posting process that posts the modification location (S16), and the test process is completed after S16.

Figure 8F:
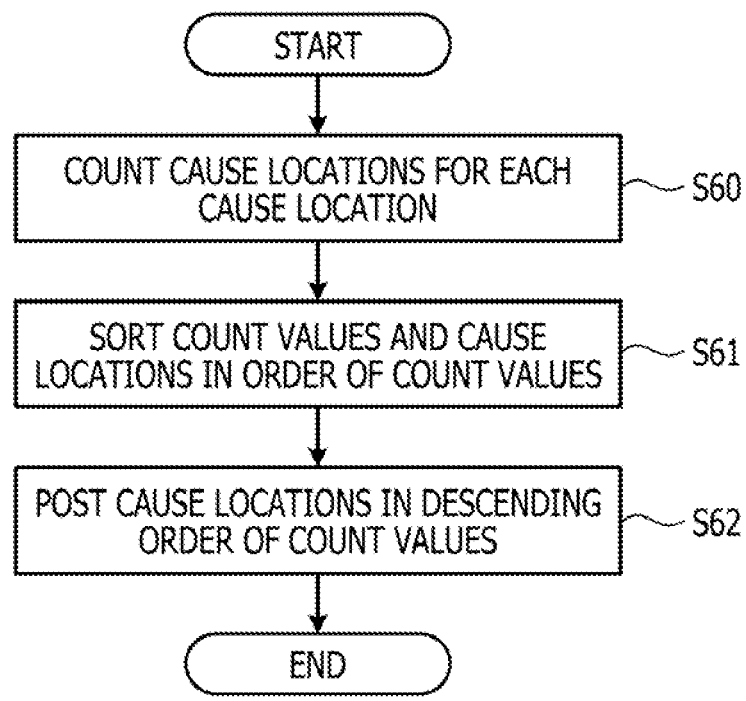
FIG. 8F is a flowchart illustrating an example of the procedure of a modification location posting process according to the embodiment.

Next, a flow of the modification location posting process will be described. FIG. 8F is a flowchart illustrating an example of the procedure of the modification location posting process according to the embodiment. This modification location posting process is executed from S16 of the test process illustrated in FIG. 8A.

As illustrated in FIG. 8F, the presentation unit 42 counts the cause locations for each cause location stored in the cause location data 31 (S60). For example, the presentation unit 42 counts the sets of scan FFs for each set of the scan FF that is a cause of the fault stop and the scan FF that is a cause of the fault excitation which are stored in the cause location data 31 as cause locations.

The presentation unit 42 sorts the count values and the cause locations in the order of the count values (S61). For example, the presentation unit 42 sorts the sets of the count values and the scan FFs in the order of the count values.

The presentation unit 42 posts the cause locations in descending order of the count values (S62). For example, the presentation unit 42 posts the sets of the count values and the scan FFs in descending order of the count values, and the modification location posting process is completed.

Figure 9B:
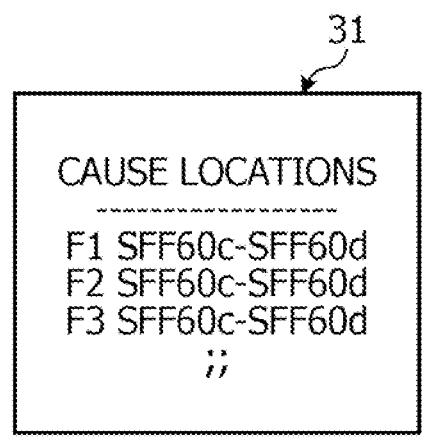
FIG. 9B is a diagram explaining an example of cause location data according to the embodiment.

Next, a specific example of the delay test will be described with reference to FIGS. 9A to 9E. FIG. 9A is a diagram explaining an example of the delay test according to the embodiment. FIG. 9A illustrates an example of a circuit 90 to be targeted for the delay test. The circuit 90 is an example of a circuit having an ADR 91. The ADR 91 is a write address decoder. The ADR 91 has a write enable (WE) input terminal and a plurality of write address (WA) input terminals as input terminals for inputting data. In FIG. 9A, WA 0, WA 1 and WA 2 are provided. The ADR 91 selects a line to be written from among a plurality of lines 92 provided with a plurality of flip-flops (FFs) according to the input of WA 0, WA 1, and WA 2. For example, with WA 0=1, the ADR 91 selects a line 92a as the line to be written. With WE=1, the ADR 91 writes to the line 92 selected by WA.

In the circuit 90, scan FFs 60a to 60d on an input side of the ADR 91 are illustrated. The scan FFs 60a to 60d are serially connected to constitute a scan chain. In FIG. 9A, Q of the scan FF 60a is connected to SI of the scan FF 60b, Q of the scan FF 60b is connected to SI of the scan FF 60c, and Q of the scan FF 60c is connected to SI of the scan FF 60d. In addition, Q of the scan FF 60a is connected to WA 2 of the ADR 91. Q of the scan FF 60b is connected to WA 1 of the ADR 91. Q of the scan FF 60c is connected to WA 0 of the ADR 91. Q of the scan FF 60d is connected to WE of the ADR 91.

In such a circuit 90, among transition faults supposed in a combination circuit of the ADR 91, a fault that accompanies the operation of transitioning WA 0 from 0 to 1 results in a redundant fault, and the test generation will fail. This is because a fault that transitions WA 0 from 0 to 1 changes Q of the scan FF 60c from 0 to 1. In this case, in the scan FF 60d, Q will change from X to 0, and WE will become 0 from X. Consequently, in the ADR 91, WE=0 is met at the receiving time point, and writing is stopped. In this manner, for a fault that accompanies the operation of transitioning WA 0 from 0 to 1, it is infeasible to observe the effect of the fault with the output in the receiving FF. Then, such a failure of the test generation represents a fault including the operation of transitioning WA 0 from 0 to 1 and occurs repeatedly a plurality of times. For example, a write entry with WA 0=1 occurs by an amount equal to the bit width.

Thus, the analysis unit 41 analyzes whether an underkill is caused when the input test data results in a redundant fault. For example, the analysis unit 41 performs a backward trace from WA 0 of the ADR 91 and identifies the scan FF 60c as the scan FF that is a cause of the fault stop. In addition, the analysis unit 41 identifies the scan FF that is a cause of the fault excitation. For example, the analysis unit 41 performs a backward trace from WE of the ADR 91 and identifies the scan FF 60d as the scan FF that is a cause of the fault excitation. Since the scan FF 60c and the scan FF 60d have an adjacency relationship, the analysis unit 41 determines that the cause of the redundant fault is related to the scan shift. The analysis unit 41 stores the scan FF 60c and the scan FF 60d in the cause location data 31 as cause locations.

The analysis unit 41 analyzes whether an underkill is caused every time the test data generated by the test generation results in a redundant fault and, when an underkill is caused, stores the cause locations in the cause location data 31. FIG. 9B is a diagram explaining an example of the cause location data 31 according to the embodiment. For example, when the test generation for faults f1, f2, and f3 including the operation of transitioning WA 0 from 0 to 1 has failed, the cause location data 31 stores, as cause locations, the scan FF 60c and the scan FF 60d (SFF60c-SFF60d), which are cause locations.

The presentation unit 42 presents a circuit modification location for avoiding the underkill, based on the analysis result by the analysis unit 41. For example, the presentation unit 42 counts the cause locations for each cause location stored in the cause location data 31 and posts the cause locations in descending order of the count values. FIG. 9C is a diagram explaining an example of a cause location count result according to the embodiment. FIG. 9C depicts the result of counting the cause locations stored in the cause location data 31 for each cause location and sorting the counted cause locations in order of the count values. In FIG. 9C, the count value of the scan FF 60c and the scan FF 60d (SFF60c-SFF60d) is N. The presentation unit 42 posts the scan FF 60c and the scan FF 60d, which are cause locations having the maximum count value of N, as locations to be modified first.

Figure 9D:
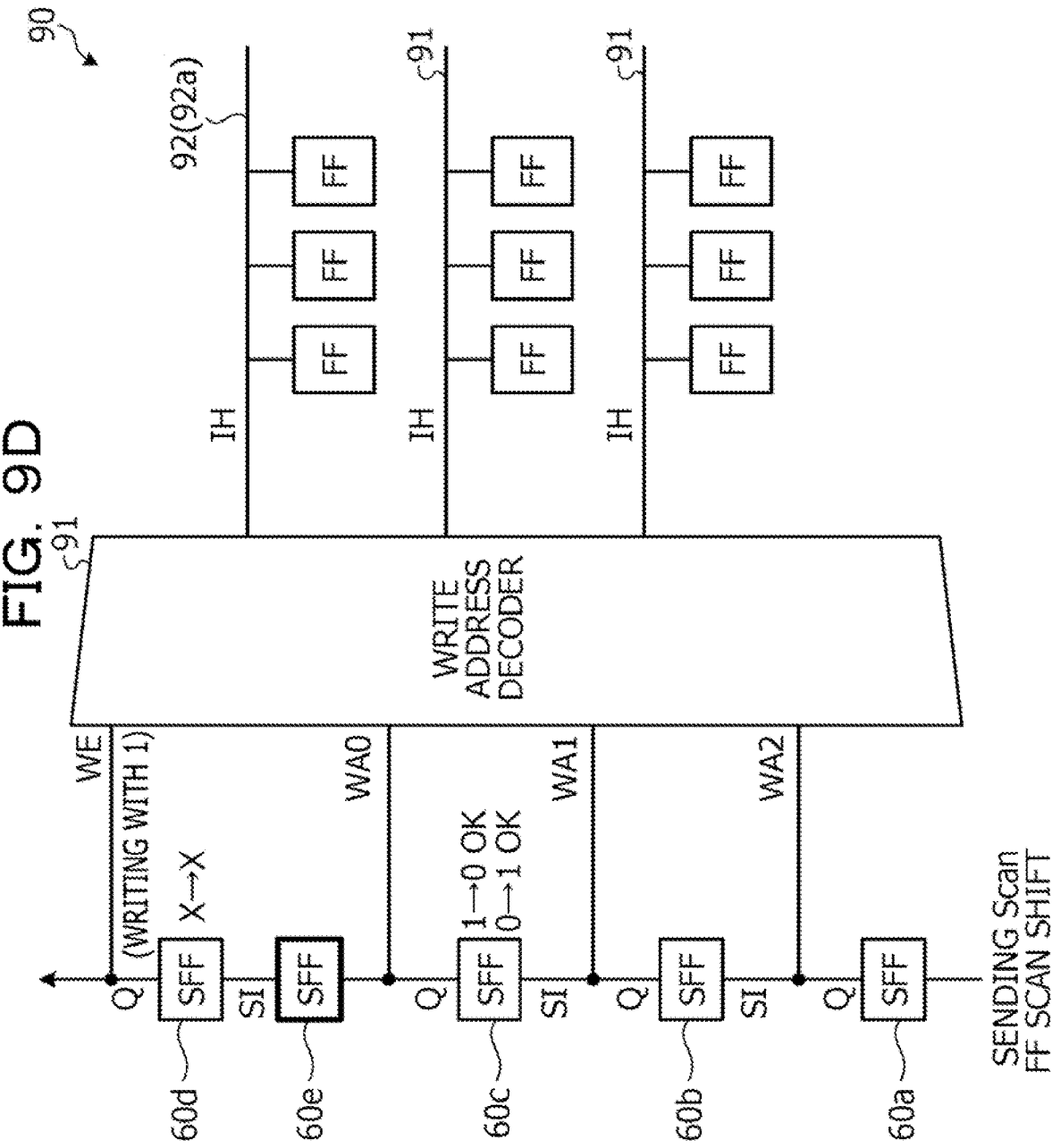
FIG. 9D is a diagram explaining an example of modification of a circuit according to the embodiment.
Figure 9E:
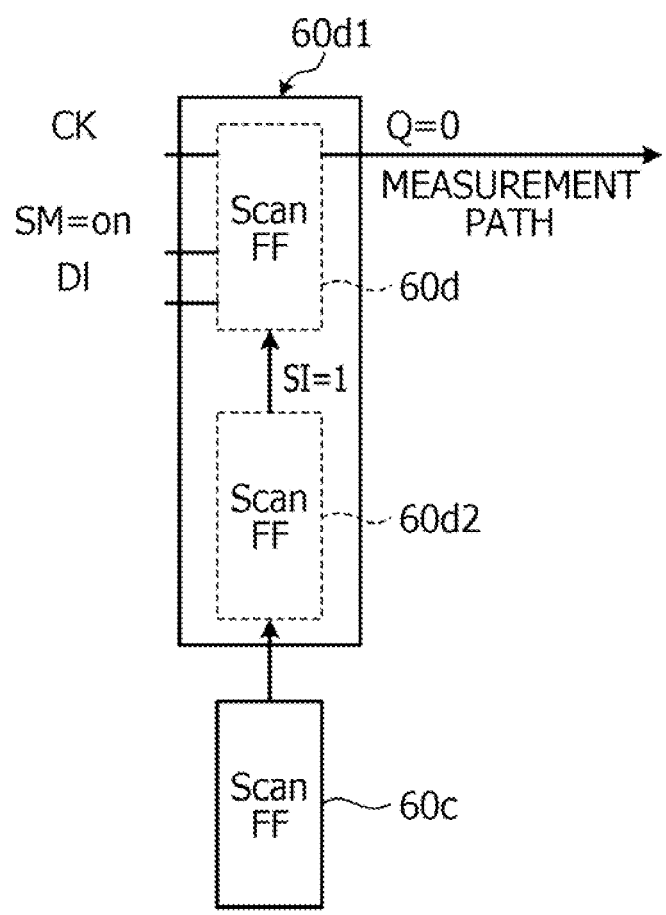
FIG. 9E is a diagram explaining an example of a scan FF formed in an extended scan approach according to the embodiment.

The presented results allow the designer to grasp the modification locations of the circuit 90 to be modified. In addition, the designer is allowed to understand the priorities of the modification locations from the presented count values. The designer modifies the modification locations of the circuit 90. FIG. 9D is a diagram explaining an example of modification of the circuit 90 according to the embodiment. In FIG. 9D, a modification is made to add a scan FF 60e between the scan FF 60c and the scan FF 60d. For example, by inserting the scan FF 60e, the adjacency relationship between the scan FF 60c and the scan FF 60d, which are causes of a redundant fault, is canceled. Note that a modification to form the scan FF 60d in an extended scan approach may also be made. FIG. 9E is a diagram explaining an example of a scan FF formed in the extended scan approach according to the embodiment. A scan FF 60*d*1 formed in the extended scan approach is provided with a dedicated scan FF 60*d*2 at SI of the scan FF 60*d*. Data is input to SI of the scan FF 60*d* via the scan FF 60*d*2.

Consequently, when Q of the scan FF 60*c* is changed from 0 to 1 due to a fault including the operation of transitioning WA 0 from 0 to 1, Q of the scan FF 60*e* changes from X to 0, and the scan FF 60*d* is not fixed at 0. Therefore, resulting in a redundant fault may be suppressed. Accordingly, the test of a fault including the operation of transitioning WA 0 from 0 to 1 is allowed to be carried out, and an underkill may be avoided.

In this manner, the circuit analysis/modification presentation device 10 (analysis device) according to the embodiment reads the circuit data and tries to generate test data for a delay fault to be targeted. The circuit analysis/modification presentation device 10 analyzes whether an underkill is caused when the delay fault being targeted results in a redundant fault. When an underkill is caused, the circuit analysis/modification presentation device 10 presents a circuit modification location for avoiding the underkill, based on the analysis result. This allows the circuit analysis/modification presentation device 10 to present the modification locations of the circuit for avoiding the underkill.

In addition, the circuit of the circuit data is provided with a scan chain in which scan flip-flops connected on an input side of a path to be tested are serially connected. The circuit analysis/modification presentation device 10 inputs test data from the scan chain to the circuit of the circuit data. The circuit analysis/modification presentation device 10 analyzes whether an underkill is caused when the input test data results in a redundant fault. This allows the circuit analysis/modification presentation device 10 to present the modification locations of the circuit for avoiding a scan shift-dependent underkill.

In addition, the circuit analysis/modification presentation device 10 identifies a scan flip-flop to which data that is a cause of the redundant fault has been input and stores the identified scan flip-flop as a cause location. The circuit analysis/modification presentation device 10 presents the stored cause location as a circuit modification location. This allows the circuit analysis/modification presentation device 10 to present the scan flip-flop that is a cause of the redundant fault, as a circuit modification location.

In addition, the circuit analysis/modification presentation device 10 identifies a location where the stuck-at fault occurred when the test data propagated through the circuit and identifies a scan flip-flop to which data that is a cause of the stuck-at fault has been input. This allows the circuit analysis/modification presentation device 10 to present the scan flip-flop to which data that is a cause of the stuck-at fault has been input, as a circuit modification location.

In addition, the circuit analysis/modification presentation device 10 identifies a gate circuit in which the stuck-at fault occurred when the test data propagated through the circuit. The circuit analysis/modification presentation device 10 sequentially performs backward tracing on the input terminals that define the output of the corresponding gate circuit, from the identified gate circuit, thereby identifying the scan flip-flop that is a cause of the fault stop. In addition, the circuit analysis/modification presentation device 10 sequentially performs backward tracing on the propagation path of the test data from the identified gate circuit, thereby identifying the scan flip-flop that is a cause of the fault excitation. The circuit analysis/modification presentation device 10 determines that an underkill is caused, when the scan flip-flop that is a cause of the fault stop and the scan flip-flop that is a cause of the fault excitation are adjacent to each other in the scan chain. This allows the circuit analysis/modification presentation device 10 to properly determine whether an underkill is caused.

In addition, the circuit analysis/modification presentation device 10 counts the cause locations for each cause location of the underkill and presents the cause locations as circuit modification locations in descending order of the count values. This allows the circuit analysis/modification presentation device 10 to make the priorities of the circuit modification locations understandable from the listing order of the circuit modification locations.

While the embodiments relating to the disclosed device have been described above, the disclosed technology may be carried out in a variety of different modes in addition to the embodiments described above. Thus, hereinafter, other embodiments included in the present embodiments will be described.

For example, in the above embodiments, the test process has been described by taking as an example a case where, when the test data results in a redundant fault, whether an underkill is caused is analyzed, and when an underkill is caused, a circuit modification location for avoiding the underkill is presented. However, the disclosed device is not limited to this example. For example, in the test process, a test such as a delay test may also be carried out on test data that does not result in a redundant fault. In addition, the test process may also be applied to dynamic fault compression.

In addition, each constituent element of the device illustrated in the drawings is functionally conceptual and does not necessarily have to be physically configured as illustrated in the drawings. For example, the specific states of separation and integration of each device are not limited to the illustrated states, and all or a part of the devices may be configured by being functionally or physically separated and integrated in any unit, according to various loads, use status, and the like. For example, each of the processing units, namely, the test processing unit 40, the analysis unit 41, and the presentation unit 42, may also be integrated or divided as appropriate. Furthermore, all or any part of respective processing functions performed by each processing unit may be implemented by a CPU and a program analyzed and executed by the corresponding CPU, or may be implemented as hardware using wired logic.

Next, an example of a hardware configuration of a computer that implements functions similar to the functions of the circuit analysis/modification presentation device 10 described in the above embodiment will be described. FIG. 10 is a diagram illustrating one example of a hardware configuration of a computer that implements functions similar to the functions of the circuit analysis/modification presentation device 10 according to the embodiment.

As illustrated in FIG. 10, a computer 300 includes a CPU 301 that executes various types of calculation processing, an input device 302 that accepts input of data from a user, and a display 303. In addition, the computer 300 includes a communication device 304 that exchanges data with an external device or the like via a wired or wireless network and an interface device 305. Furthermore, the computer 300 includes a RAM 306 which temporarily stores various types of information and a hard disk device 307. Then, each of the devices 301 to 307 is connected to a bus 308.

The hard disk device 307 has an analysis program 307*a* that executes the test process. In addition, the CPU 301 reads the analysis program 307*a* and loads the read analysis program 307*a* into the RAM 306.

The analysis program 307a functions as an analysis process 306a. The processing of the analysis process 306a corresponds to the processing of the test processing unit 40, the analysis unit 41, and the presentation unit 42.

Note that the analysis program 307a does not necessarily have to be stored in the hard disk device 307 beforehand. For example, the program is stored in a "portable physical medium" to be inserted in the computer 300, such as a flexible disk (FD), a compact disc read only memory (CD-ROM), a digital versatile disc (DVD), a magneto-optical disk, or an integrated circuit (IC) card. Then, the computer 300 may also read and execute the analysis program 307a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an analysis program for causing a computer to execute a process comprising:
   reading circuit data;
   trying to generate test data for a delay fault to be targeted;
   analyzing whether an underkill is caused when the targeted delay fault results in a redundant fault; and
   presenting circuit modification locations to avoid the underkill, based on an analysis result, when the underkill is caused.

2. The non-transitory computer-readable recording medium storing the analysis program according to claim 1, wherein
   a circuit of the circuit data is provided with a scan chain in which scan flip-flops connected on an input side of a path to be tested are serially connected,
   the trying to generate the test data includes inputting the test data from the scan chain to the circuit of the circuit data, and
   the analyzing includes analyzing whether the underkill is caused when the test data that has been input results in the redundant fault.

3. The non-transitory computer-readable recording medium storing the analysis program according to claim 2, wherein
   the analyzing includes identifying the scan flip-flops to which data that is a cause of the redundant fault has been input, and storing the scan flip-flops that have been identified, as cause locations, and
   the presenting includes presenting the cause locations that have been stored, as the circuit modification locations.

4. The non-transitory computer-readable recording medium storing the analysis program according to claim 3, wherein the analyzing includes identifying a location where a stuck-at fault occurred when the test data propagated through the circuit, and identifying the scan flip-flops to which data that is the cause of the stuck-at fault has been input.

5. The non-transitory computer-readable recording medium storing the analysis program according to claim 4, wherein
   the analyzing includes: identifying a gate circuit in which the stuck-at fault occurred when the test data propagated through the circuit; sequentially performing backward tracing on input terminals that define output of the corresponding gate circuit that has been identified, from the gate circuit, to identify the scan flip-flops that are the cause of a fault stop; and sequentially performing backward tracing on a propagation path of the test data from the gate circuit that has been identified, to identify the scan flip-flops that are the cause of fault excitation; and determining that the underkill is caused, when the scan flip-flops that are the cause of the fault stop and the scan flip-flops that are the cause of the fault excitation are adjacent to each other in the scan chain.

6. The non-transitory computer-readable recording medium storing the analysis program according to claim 1, wherein
   the presenting includes counting the cause locations for each of the cause locations of the underkill, and presenting the cause locations as circuit modification locations in descending order of count values.

7. An analysis method comprising:
   reading, by a computer, circuit data;
   trying to generate test data for a delay fault to be targeted;
   analyzing whether an underkill is caused when the targeted delay fault results in a redundant fault; and
   presenting circuit modification locations to avoid the underkill, based on an analysis result, when the underkill is caused.

8. The analysis method according to claim 7, wherein
   a circuit of the circuit data is provided with a scan chain in which scan flip-flops connected on an input side of a path to be tested are serially connected,
   the trying to generate the test data includes inputting the test data from the scan chain to the circuit of the circuit data, and
   the analyzing includes analyzing whether the underkill is caused when the test data that has been input results in the redundant fault.

9. The analysis method according to claim 8, wherein
   the analyzing includes identifying the scan flip-flops to which data that is a cause of the redundant fault has been input, and storing the scan flip-flops that have been identified, as cause locations, and
   the presenting includes presenting the cause locations that have been stored, as the circuit modification locations.

10. The analysis method according to claim 9, wherein the analyzing includes identifying a location where a stuck-at fault occurred when the test data propagated through the circuit, and identifying the scan flip-flops to which data that is the cause of the stuck-at fault has been input.

11. The analysis method according to claim 10, wherein
    the analyzing includes: identifying a gate circuit in which the stuck-at fault occurred when the test data propagated through the circuit; sequentially performing backward tracing on input terminals that define output of the corresponding gate circuit that has been identified, from the gate circuit, to identify the scan flip-flops that are the cause of a fault stop; and sequentially performing backward tracing on a propagation path of the test data from the gate circuit that has been identified, to identify the scan flip-flops that are the cause of fault excitation; and determining that the underkill is caused, when the scan flip-flops that are the cause of the fault stop and the scan flip-flops that are the cause of the fault excitation are adjacent to each other in the scan chain.

12. The analysis method according to claim 7, wherein the presenting includes counting the cause locations for each of the cause locations of the underkill, and presenting the cause locations as circuit modification locations in descending order of count values.

13. An analysis device comprising:
a memory; and
a processor coupled to the memory and configured to:
read circuit data;
try to generate test data for a delay fault to be targeted;
analyze whether an underkill is caused when the targeted delay fault results in a redundant fault; and
present circuit modification locations to avoid the underkill, based on an analysis result, when the underkill is caused.

14. The analysis device according to claim 13, wherein a circuit of the circuit data is provided with a scan chain in which scan flip-flops connected on an input side of a path to be tested are serially connected,
the processor inputs the test data from the scan chain to the circuit of the circuit data, and analyzes whether the underkill is caused when the test data that has been input results in the redundant fault.

15. The analysis device according to claim 14, wherein the processor identifies the scan flip-flops to which data that is a cause of the redundant fault has been input, and storing the scan flip-flops that have been identified, as cause locations, and presents the cause locations that have been stored, as the circuit modification locations.

16. The analysis device according to claim 15, wherein the processor identifies a location where a stuck-at fault occurred when the test data propagated through the circuit, and identifies the scan flip-flops to which data that is the cause of the stuck-at fault has been input.

17. The analysis device according to claim 16, wherein the processor:
identifies a gate circuit in which the stuck-at fault occurred when the test data propagated through the circuit;
sequentially performs backward tracing on input terminals that define output of the corresponding gate circuit that has been identified, from the gate circuit, to identify the scan flip-flops that are the cause of a fault stop;
sequentially performs backward tracing on a propagation path of the test data from the gate circuit that has been identified, to identify the scan flip-flops that are the cause of fault excitation; and
determines that the underkill is caused, when the scan flip-flops that are the cause of the fault stop and the scan flip-flops that are the cause of the fault excitation are adjacent to each other in the scan chain.

18. The analysis device according to claim 13, wherein the processor counts the cause locations for each of the cause locations of the underkill, and presents the cause locations as circuit modification locations in descending order of count values.

* * * * *